US006318446B1

(12) United States Patent
Nichols et al.

(10) Patent No.: US 6,318,446 B1
(45) Date of Patent: Nov. 20, 2001

(54) ONE PIECE CAST VEHICLE WHEEL HAVING A CIRCUMFERENTIAL LIGHTENER POCKET

(75) Inventors: John J. Nichols, Fort Wayne, IN (US); Romulo A. Prieto, Northville; John D. Nitz, Yipsilanti, both of MI (US)

(73) Assignee: Hayes Lemmerz International, Inc., Romulus, MI (US)

( * ) Notice: Subject to any disclaimer, the term of this patent is extended or adjusted under 35 U.S.C. 154(b) by 0 days.

(21) Appl. No.: 09/421,724

(22) Filed: Oct. 20, 1999

Related U.S. Application Data

(63) Continuation of application No. PCT/US98/08122, filed on Apr. 21, 1998.
(60) Provisional application No. 60/043,933, filed on Apr. 21, 1997.

(51) Int. Cl.[7] .......................... B22D 33/04; B22D 17/26; B22C 9/28
(52) U.S. Cl. .................. 164/137; 164/DIG. 14; 164/342; 249/56
(58) Field of Search .................. 164/DIG. 14, 63, 164/113, 114, 137, 312, 340, 341, 342; 249/56; 152/381.3; 301/65, 97

(56) References Cited

U.S. PATENT DOCUMENTS

| 4,420,190 | 12/1983 | Rohr . | |
|---|---|---|---|
| 4,436,133 | * 3/1984 | Rohr | 152/381.3 |
| 4,482,189 | 11/1984 | Samuelson et al. . | |
| 4,861,113 | 8/1989 | Imamura et al. . | |
| 5,311,918 | * 5/1994 | Scott | 164/63 |
| 5,320,160 | * 6/1994 | Kato et al. | 164/305 |
| 5,360,261 | 11/1994 | Archibald et al. . | |
| 5,415,464 | 5/1995 | Scott . | |
| 5,548,896 | 8/1996 | Archibald et al. . | |
| 5,647,426 | * 7/1997 | Prieto et al. | 164/348 |
| 5,896,912 | * 4/1999 | Monroe et al. | 164/134 |

* cited by examiner

Primary Examiner—Tom Dunn
Assistant Examiner—Kevin McHenry
(74) Attorney, Agent, or Firm—MacMillan, Sobanski & Todd, LLC

(57) ABSTRACT

A one piece cast wheel having a lightener recess formed in the wheel disc which extends axially beneath the wheel outboard tire bead seat. A method of casting such a one piece wheel which utilizes a multi-piece wheel mold having side members which include a plurality of components. A core for forming the lightener cavity is formed integrally with the side member components. The side member components are sequentially moved relative to each other to release the core from the lightener cavity.

9 Claims, 27 Drawing Sheets

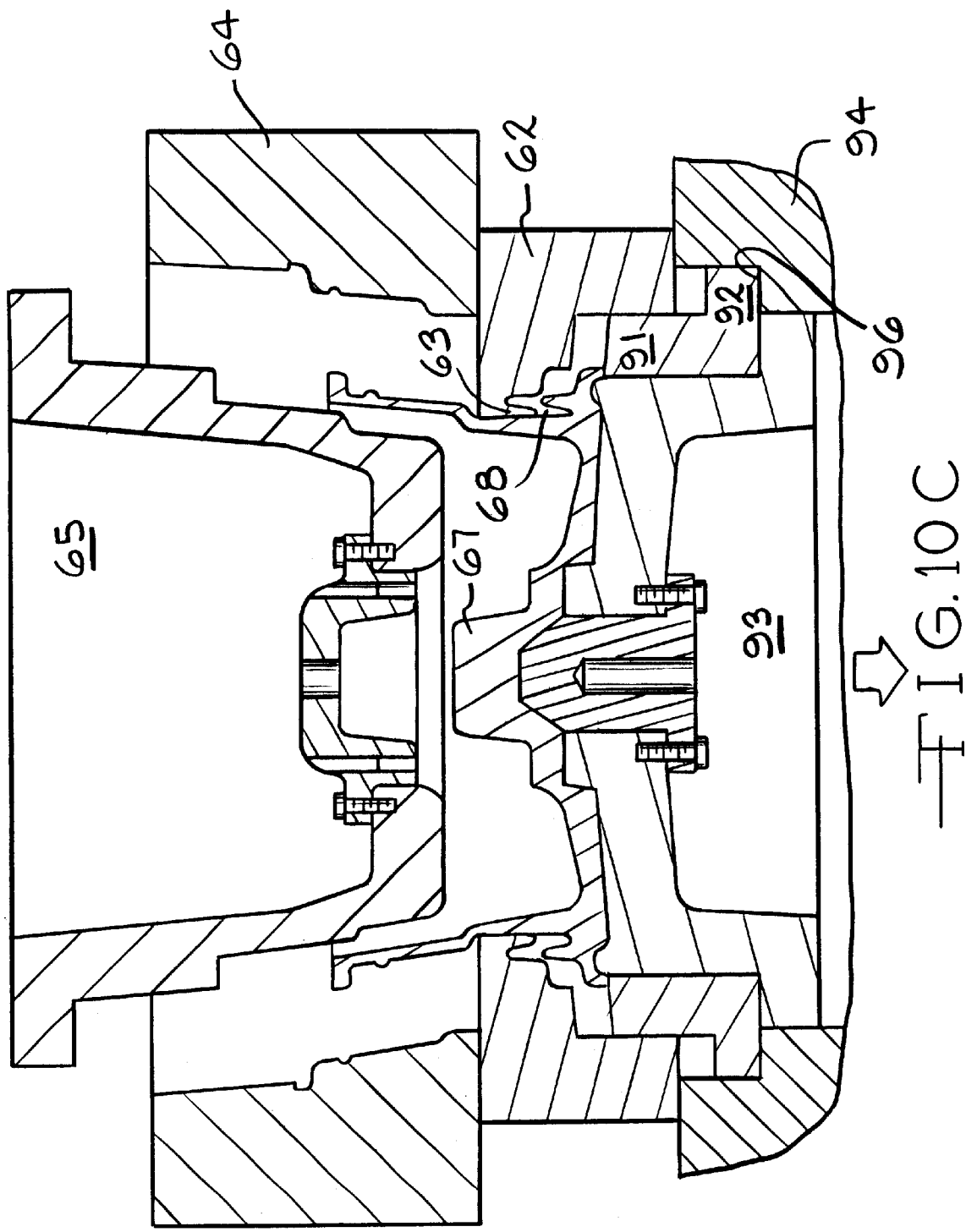

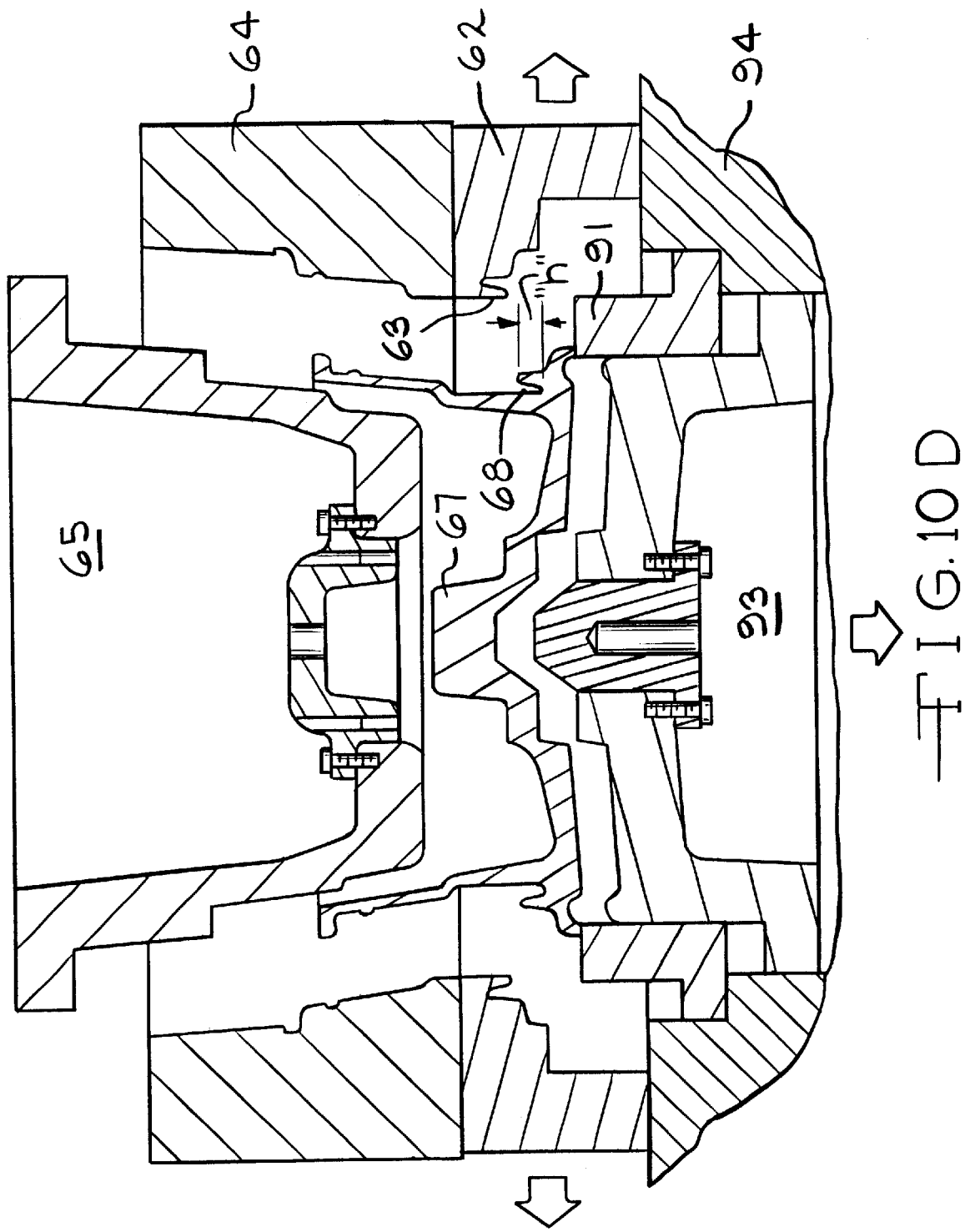

ONE PIECE CAST VEHICLE WHEEL HAVING A CIRCUMFERENTIAL LIGHTENER POCKET

CROSS REFERENCE TO RELATED APPLICATIONS

This application is a continuation of a, PCT Patent Application No. PCT/US98/08122 filed on Apr. 21, 1998 and claims the benefit of U.S. Provisional Application No. 60/043,933, filed on Apr. 21, 1997.

BACKGROUND OF THE INVENTION

This invention relates in general to vehicle wheels and in particular to a one piece cast vehicle wheel having a lightener pocket formed beneath the outboard tire bead seat and an apparatus and process for casting the one piece wheel.

It is known in the art to cast one piece wheels from an alloy of a light weight metal, such as, for example, an alloy of aluminum, magnesium or titanium. Conventional highly automated and high volume casting machines can be used to gravity cast such wheels. Such machines typically include a rotatable carousel which carries a plurality of multi-piece wheel molds. As the carousel is indexed, each wheel mold is sequentially rotated toward a charging station. Upon reaching the charging station, molten metal is poured into the mold. As the carousel continues to be indexed, the metal cools to form a wheel casting. Once the metal is completely solidified, the mold is opened and the wheel casting removed. Risers and gates are removed from the casting and the casting is machined to a final shape.

A typical cast wheel includes a generally cylindrical wheel rim which is adapted to carry a pneumatic vehicle tire. The rim has a recessed center portion which is called a deepwell. Extending from the deepwell toward the inboard end of the wheel is a tapered portion called a leg. The leg terminates in a circumferential inboard tire safety bead which retains an inboard tire wall bead upon the wheel rim. Adjacent to the inboard tire safety bead is an inboard tire bead seat which carries the inboard tire wall bead. The inboard end of the wheel rim terminates in an inboard tire retaining flange.

The outboard end of the deepwell ends at a deepwell wall which extends radially to a circumferential outboard tire safety bead which retains an outboard tire wall bead upon the wheel rim. Adjacent to the outboard tire safety bead is an outboard tire bead seat which carries the outboard tire wall bead. The outboard end of the wheel rim terminates in an outboard tire retaining flange.

The wheel further includes a circular wheel disc which is typically formed across the outboard end of the wheel rim to provide a sufficient volume within the wheel to receive the larger disc brake assemblies used on current cars and steering and drive components which are included in front wheel drive vehicles. The wheel disc typically includes a central wheel hub which is supported within the wheel rim by plurality of wheel spokes. A pilot hole is formed through the center of the wheel hub and a plurality of wheel lug holes are formed through the wheel hub on a bolt-circle which is concentric with the pilot hole. The outboard end of the wheel rim supports the wheel spokes and is commonly referred to as a wheel sidewall.

Alternately, a wheel spider comprising a wheel hub and a plurality of spokes can be formed within the wheel rim.

SUMMARY

This invention relates to a one piece cast wheel having a lightener pocket formed beneath the outboard tire bead seat and an apparatus and process for casting the one piece wheel.

As described above, it is known to cast a one piece wheel from an alloy of a light weight metal. The geometry of such wheels typically causes the wheel to have a sidewall which includes a large volume of metal. Accordingly, the sidewall adds to the total weight of the wheel and the unsprung weight of the associated vehicle suspension. Thus, it would be desirable to form lightener pockets in the sidewall of such wheels to reduce the wheel weight.

The present invention contemplates a one piece vehicle wheel which includes an annular wheel rim having an inboard and an outboard end and a wheel disc formed integrally with the wheel rim. The wheel disc extends radially across an end of the wheel rim and has an outer edge joining the outboard end of the wheel rim to form a wheel sidewall. The wheel also includes an annular lightener recess formed in the sidewall.

Additionally, the wheel further includes an outboard tire bead seat formed in the sidewall with the recess extends axially into the sidewall beneath the outboard tire bead seat. It is further contemplated that a portion of the sidewall extends transversely across the recess to form a bridge portion, with an aperture being formed through the bridge portion. The aperture being adapted to receive a tire valve. The recess can be either continuous or can include a plurality of webs extending transversely thereacross.

The invention also contemplates that the recess includes at lease one pocket formed therein which extends further into the sidewall from the recess. In the preferred embodiment, the pocket is formed in the recess adjacent to the outer end of a wheel spoke.

The invention further contemplates a method for forming a one piece vehicle wheel which includes providing a multi-piece mold for a one piece wheel. The mold includes a base member which supports a plurality of side members and a top core, the members and top core defining a wheel cavity having a rim cavity joining a disc to define a sidewall cavity. The mold defining a generally vertical axis and further including an annular lightener recess core which extends axially into the sidewall cavity. The mold is charged with molten metal to form a one piece wheel. The mold is then cooled to solidify the molten metal into a one piece wheel casting with the annular core forming a lightener recess in the sidewall of the wheel casting. The mold is opened and the recess core removed to release a one piece wheel casting having an annular lightener recess formed in the sidewall.

The method further contemplates that the mold includes a plurality of upper side members and a plurality of lower side members with the lightener recess core includes a plurality of segments integrally formed as a portion of the lower side members. Additionally, when the mold is opened, the upper and lower side members are sequentially withdrawn to extract the lightener core segments from the wheel casting.

Alternately, the mold can include a separate ring annular lightener recess core which is carried by the mold members. After opening the mold the wheel casting and core are removed together. Subsequently, the core is removed from the wheel casting.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
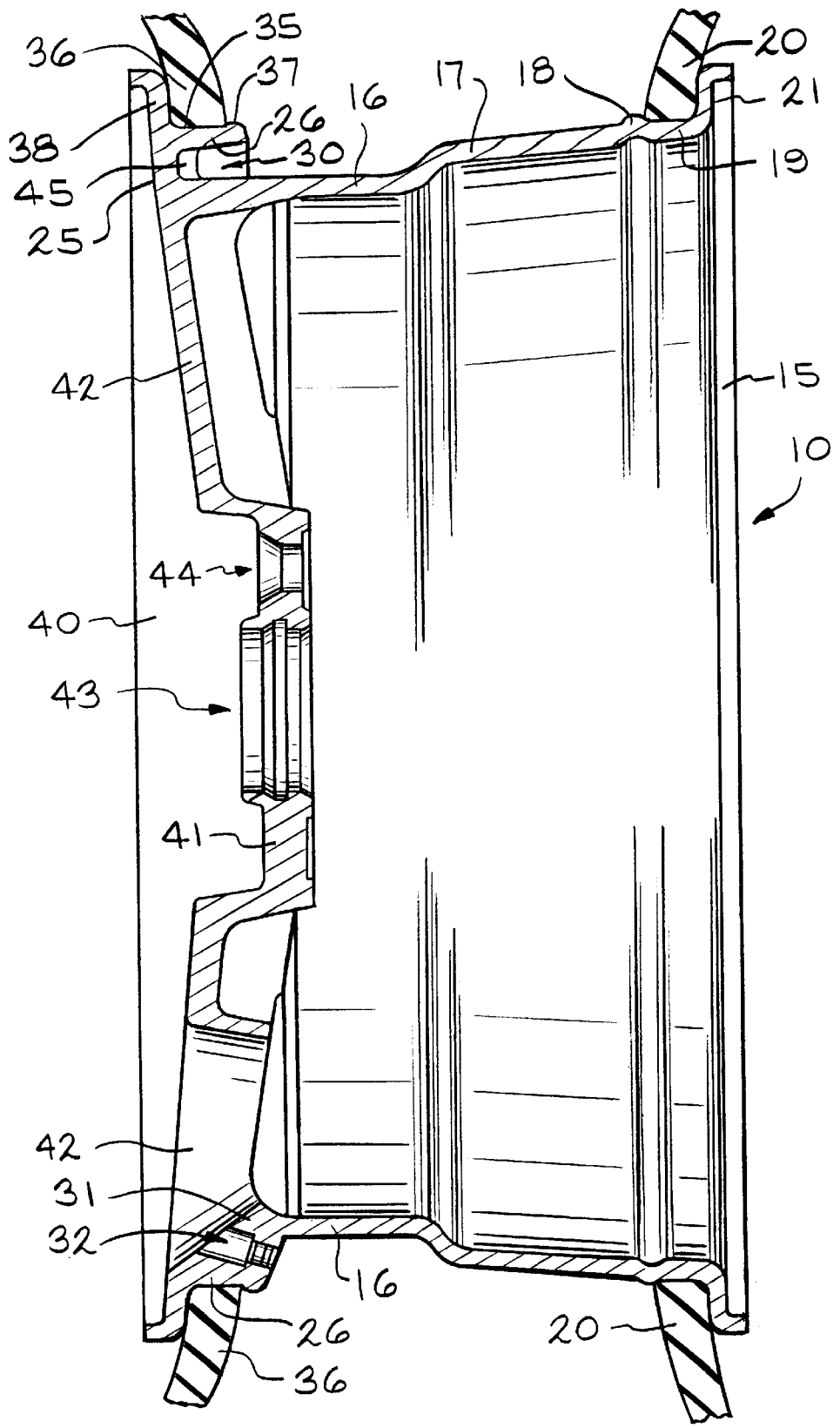
FIG. 1 is a sectional view of a cast wheel in accordance with the invention.

Referring now to the drawings, there is illustrated in FIG. 1 a partial sectional view of a cast one piece wheel 10 formed in accordance with the invention. The wheel 10 includes a generally cylindrical wheel rim 15 which has a recessed center deepwell 16. Extending from the deepwell 16 toward the inboard end of the wheel is a tapered leg portion 17. The leg portion 17 terminates in a circumferential inboard tire safety bead 18. Adjacent to the inboard tire safety bead 18 is an inboard tire bead seat 19 which is adapted to carry an inboard tire wall bead 20 of a pneumatic tire. The inboard end of the wheel rim 15 terminates in a radially extending inboard tire retaining flange 21.

The outboard end of the deepwell 16 is adjacent to a wheel sidewall 25 which includes the outboard end of the wheel rim 15. The sidewall 25 is shown in greater detail as a perspective view in FIG. 2. The inboard portion of the sidewall 25 is formed into an annular wall 26 which extends axially toward the inboard end of the wheel rim 15. The annular wall 26 cooperates with the deepwell 16 to define a circumferential lightener recess 30 which extends around the wheel rim 16. In the preferred embodiment, a narrow bridge 31, which is shown at the bottom of FIG. 1, is formed across the recess 31 from the deepwell 16 to the annular wall 26. A aperture 32 extends through the bridge 31. The aperture 32 is counterbored to receive a tire valve (not shown) for supplying pressurized inflation air to the tire. Alternately, the aperture 32 may be located in another portion of the sidewall 25, allowing a continuous recess to be formed in the sidewall 25.

The annular wall 26 includes an outer surface which is formed as an outboard tire bead seat 35. The outboard tire bead seat 35 is adapted to carry an outboard tire bead 36. Additionally, a circumferential outboard tire safety bead 37 is formed in the outer surface of the annular wall 26. The outboard end of the wheel rim 15 terminates in a radially extending outboard tire retaining flange 38.

The wheel 10 further includes a circular wheel disc 40 which is cast across the outboard end of the wheel rim 15. The wheel disc 40 includes a central wheel hub 41 supported within the wheel rim 15 by plurality of wheel spokes 42 (two shown). A pilot hole 43 is formed through the center of the wheel hub 41 and a plurality of wheel lug holes 44 (one shown) are formed through the wheel hub 41 on a bolt-circle which is concentric with the pilot hole 43.

Figure 2:
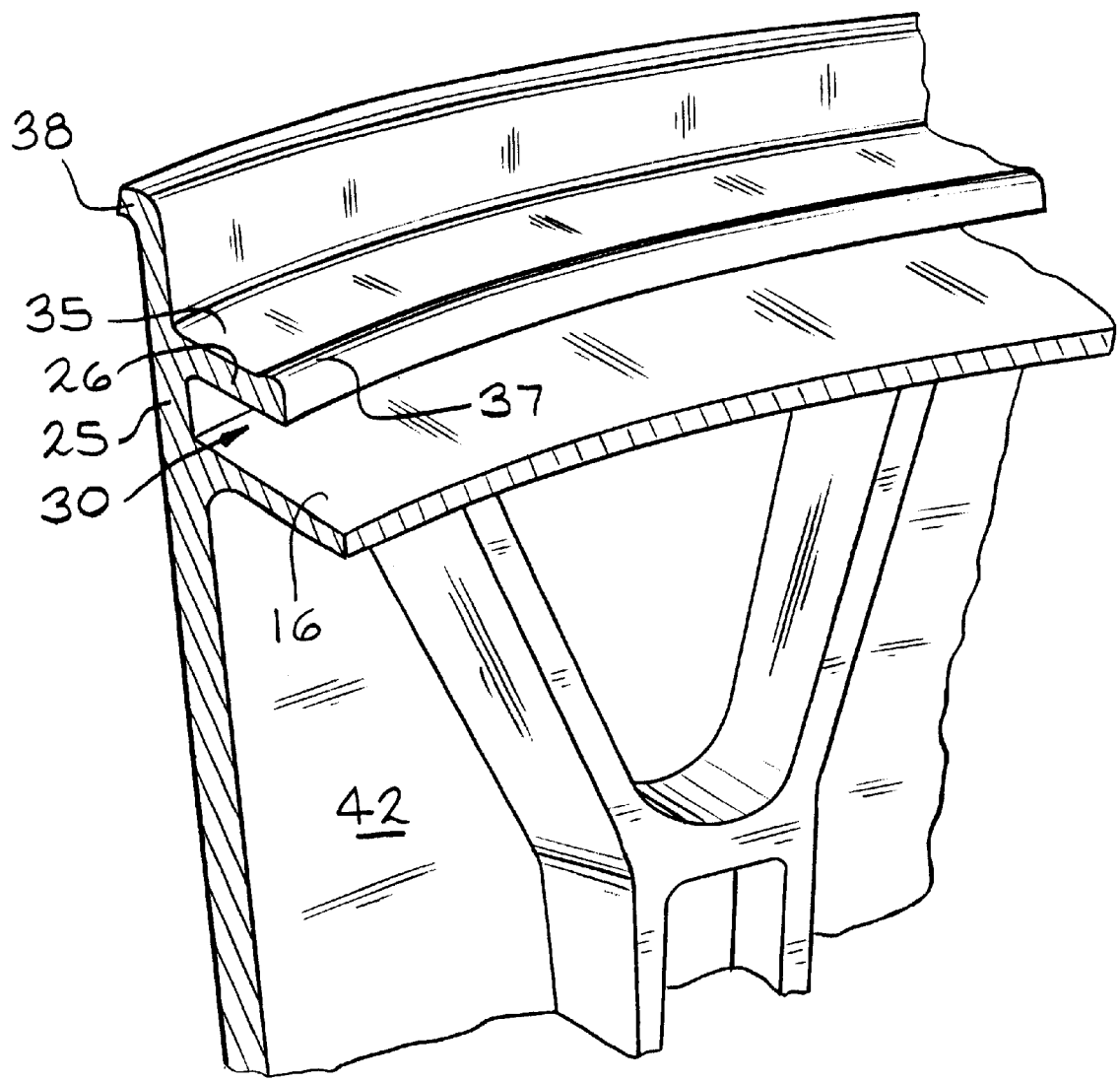
FIG. 2 is a partial rear perspective view of the wheel shown in FIG. 1.

As shown in FIGS. 1 and 2, in the preferred embodiment the lightener recess 30 extends beneath the outboard tire bead seat 35. It will be appreciated that the invention also can be practiced with the recess 30 extending a greater or lessor axial distance into the wheel sidewall 25. In the preferred embodiment, the depth of the recess 30 varies about the circumference thereof with the recess depth increasing adjacent to the ends of the wheel spokes, as shown at the top of FIG. 1 where one of the deeper recesses forms a pocket 45. However, it will be appreciated that the invention also can be practiced without forming the pockets 45 within the recess 30. Additionally, while in the preferred embodiment the walls of the recess 30 are generally parallel, the recess 30 also can be formed with non-parallel walls. In such a case, the walls would extend into the sidewall 25 with a decreasing taper formed therebetween (not shown).

Figure 3:
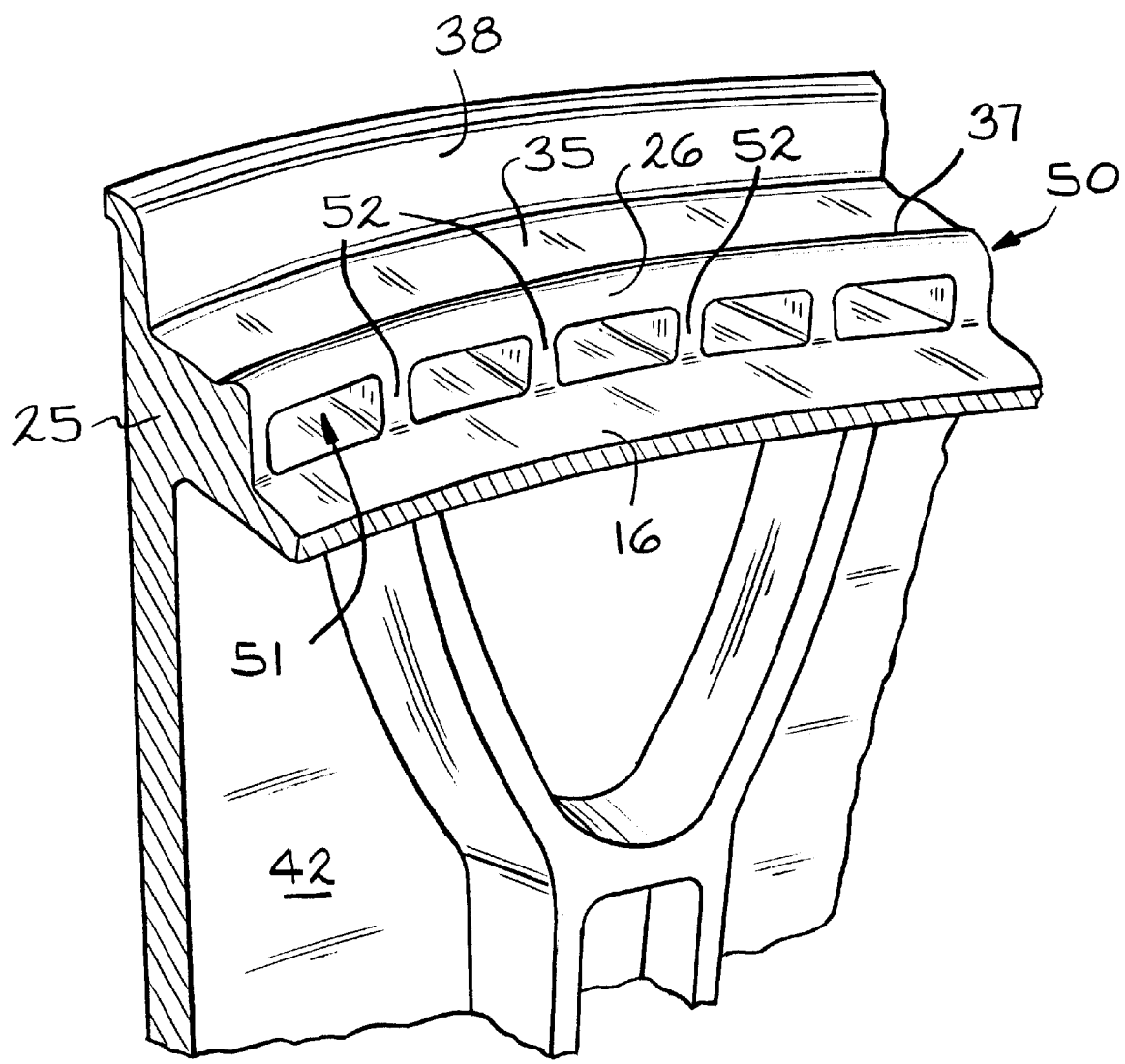
FIG. 3 is a partial rear perspective view of an alternate embodiment of the wheel shown in FIG. 1.

An alternate embodiment of the wheel is illustrated generally at 50 in FIG. 3. Portions of the wheel 50 which are similar to portions of the wheel 10 shown in FIGS. 1 and 2 are identified by the same numerical designators. The wheel 50 includes a circumferential lightener recess 51 which extends axially into the sidewall 25 beneath the outboard tire bead seat 35. The wheel 50 further has a plurality of webs 52 which extend radially across the recess 51 between the deepwell 16 and the annular wall 26. In the preferred embodiment, the webs 52 are circumferentially equally spaced within the recess 51 and have relatively narrow widths. Additionally, as shown in FIG. 3, the webs 52 are flush with the inboard end of the annular wall 26.

Figure 4:
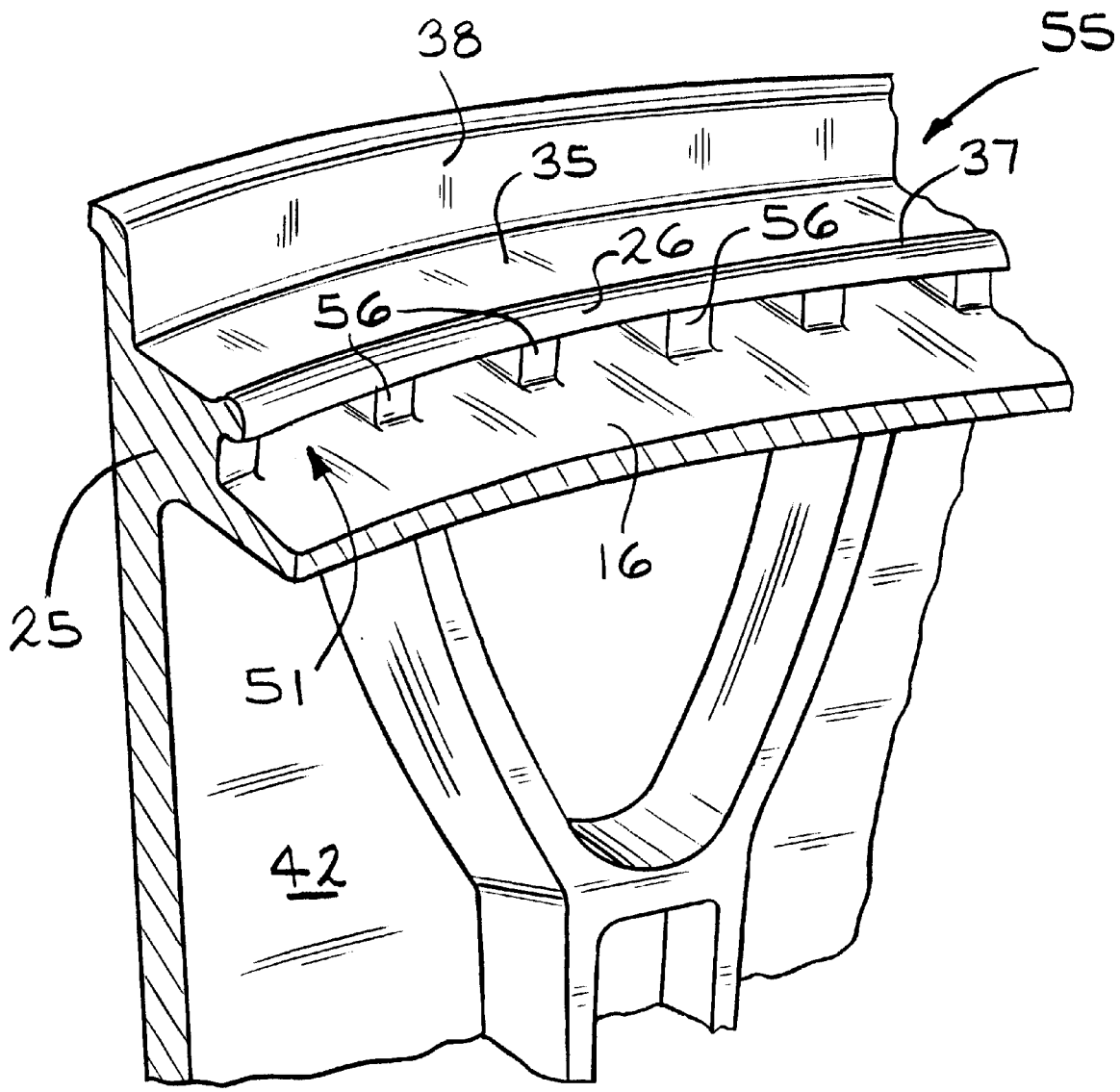
FIG. 4 is a partial rear perspective view of another alternate embodiment of the wheel shown in FIG. 1.

Another alternate embodiment of the wheel is illustrated generally at 55 in FIG. 4. Portions of the wheel 55 which are similar to portions of the wheels 10 and 50 shown in FIGS. 1 through 3 are identified by the same numerical designators. The wheel 55 includes a circumferential lightener recess 51 which extends axially into the sidewall 25 beneath the outboard tire bead seat 35. The wheel 55 further has a plurality of webs 56 which extend radially across the recess 51 between the deepwell 16 and the annular wall 26. Similar to the wheel 50 described above, the webs 56 are circumferentially equally spaced within the recess 51 and have relatively narrow widths; however, as shown in FIG. 4, the webs 56 are recessed within the recess 51.

Figure 5A:
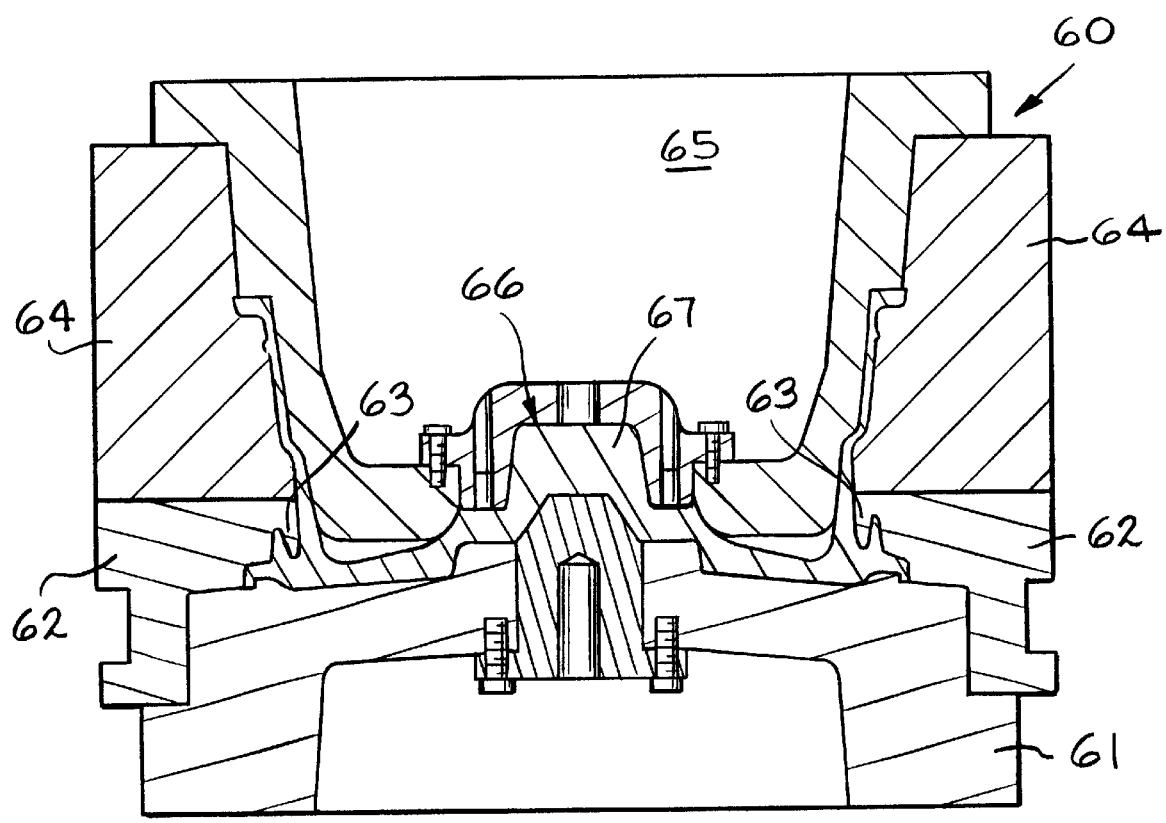
FIG. 5 is a sectional view of a wheel mold and is illustrative of a process for casting the wheel shown in FIG. 1 in accordance with the invention.

The present invention also contemplates an apparatus and method for forming the lightener recess 30. In FIG. 5A, there is shown a sectional view of a multi-piece wheel mold 60 for casting a one piece vehicle wheel which includes a lightener pocket as described above. The wheel mold 60 can be used with conventional casting methods, such as gravity and low pressure casting. For simplicity, gates and spruces have not been included in FIG. 5A. Similarly, conventional mechanisms for moving the individual mold components have not been shown in FIG. 5A.

The mold 60 includes a base member 61 which supports a plurality of lower side members 62. The lower side members can be retracted and extended in a horizontal direction or moved vertically in an upward and also downward direction by a conventional mechanism. The inner surface of each of the lower side members 62 is formed into a segment of an annular lightener recess core 63. The lightener recess core 63 extends in a downward axial direction in FIG. 5A and can include a plurality of recesses (not shown) for forming corresponding webs in the wheel casting. Similarly, portions of the lightener recess core 63 can extend further in an axial direction (not shown) to form deeper pockets in the lightener recess. In the preferred embodiment, the deeper pockets are formed adjacent to the spoke ends of the wheel casting.

A plurality of upper side members 64 are carried by the lower side members 62. Similar to the lower side members 62, the upper side members 64 can be retracted and extended in a horizontal direction and also moved vertically in an upward or downward direction by a conventional mechanism. The horizontal movement of the upper side members 64 can be independent of the horizontal movement of the lower side members 62.

A cup-shaped vertically movable top core 65 extends into the mold 60. The top core 65 can be moved vertically upward and downward by a conventional mechanism. The base and top core co-operate with the side members 62 and 64 to define a wheel mold cavity 66. As shown in FIG. 5A, the lightener recess core 63 extends axially into the sidewall portion of the mold cavity 66.

Figure 5B:
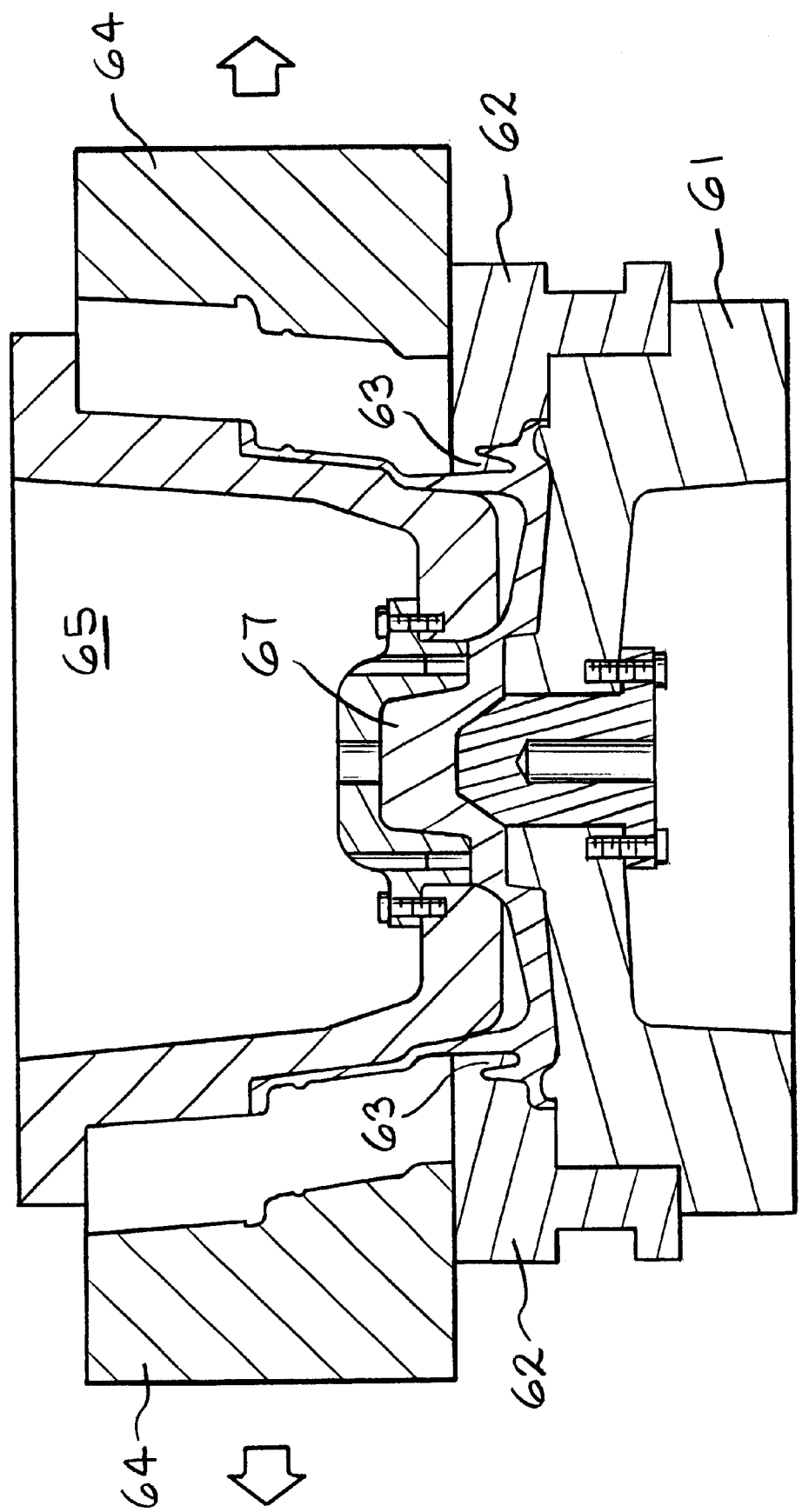
Figure 5C:
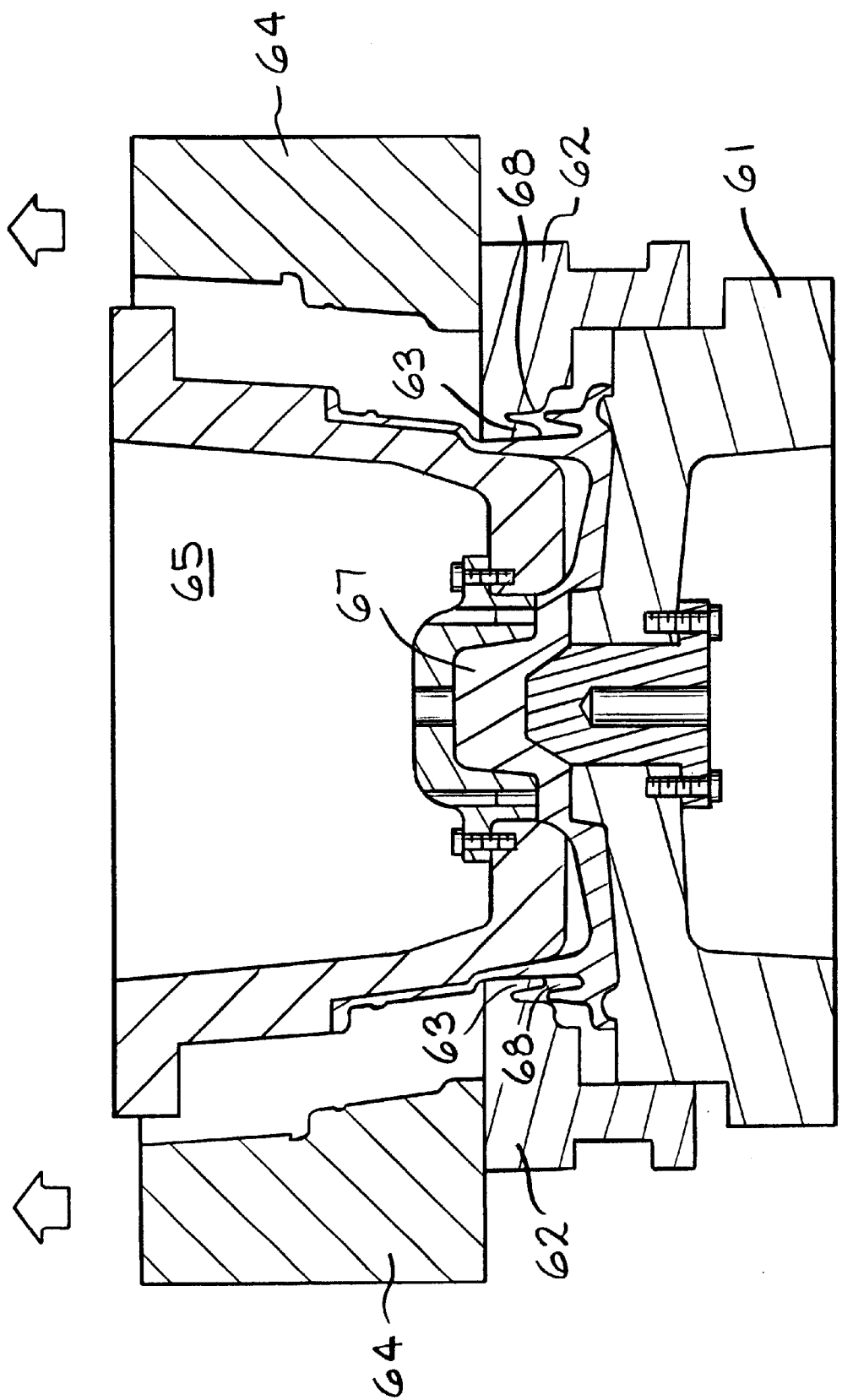
Figure 5D:
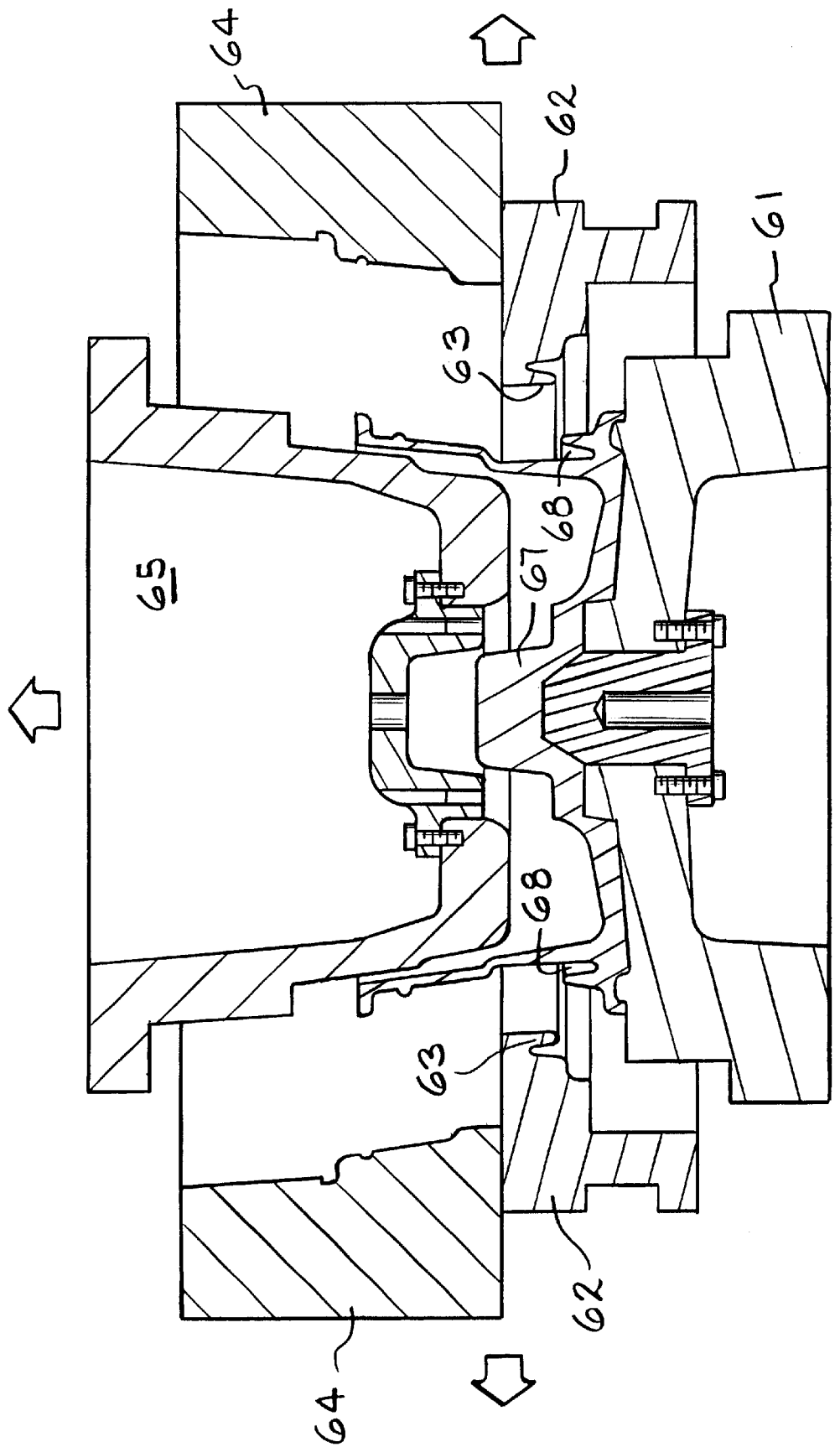

In FIG. 5A, the mold cavity 66 has been filled with molten metal which has solidified to form a wheel casting 67 having a sidewall portion. The lightener recess core 63 has formed a lightener recess 68 which is shown in FIGS. 5C and 5D and extends in an axial direction into the sidewall portion of the wheel casting 67.

The operation of the wheel mold 60 will now be described. After the wheel casting 67 has cooled sufficiently, the upper side members 64 are retracted in a horizontal direction, as shown by the arrows in FIG. 5B. The upper side members 64 are retracted sufficiently to allow the upper and lower side members 64 and 62 to be moved in a vertical upward direction with the upper side members 64 passing over a portion of the upper edge of the top core 65, as shown in FIG. 5C. The upper and lower side members 64 and 62 are moved sufficiently in the vertical direction to extract the lightener pocket core 63 from the lightener pocket 68 formed in the wheel casting 67. In the preferred embodiment, the deepwell portion of the wheel casting 67 has a generally cylindrical shape to allow the upward movement of the lower side members 62 past the wheel casting 67. Both the upper and lower side members 64 and 62 are then retracted horizontally and the top core 65 raised, as shown in FIG. 5D, to allow removal of the wheel casting 67 from the mold 60. After removing the wheel casting 67, the mold members are again closed in preparation for casting another wheel.

While the preferred embodiment of the invention has been illustrated and described as forming a wheel having a generally cylindrical deepwell, it will be appreciated that the invention also can practiced with other wheel deepwell shapes. For the alternate shapes, the geometry of the lightener pocket core 63 corresponds to the shape of the wheel casting deepwell to facilitate the extraction of the core 63 from the lightener pocket 68. For example, the deepwell and lightener recess surfaces can be parallel or tapered to allow the recess core 63 to slide past lower the casting deepwell as the lower side member 62 moves upward.

Figure 6A:
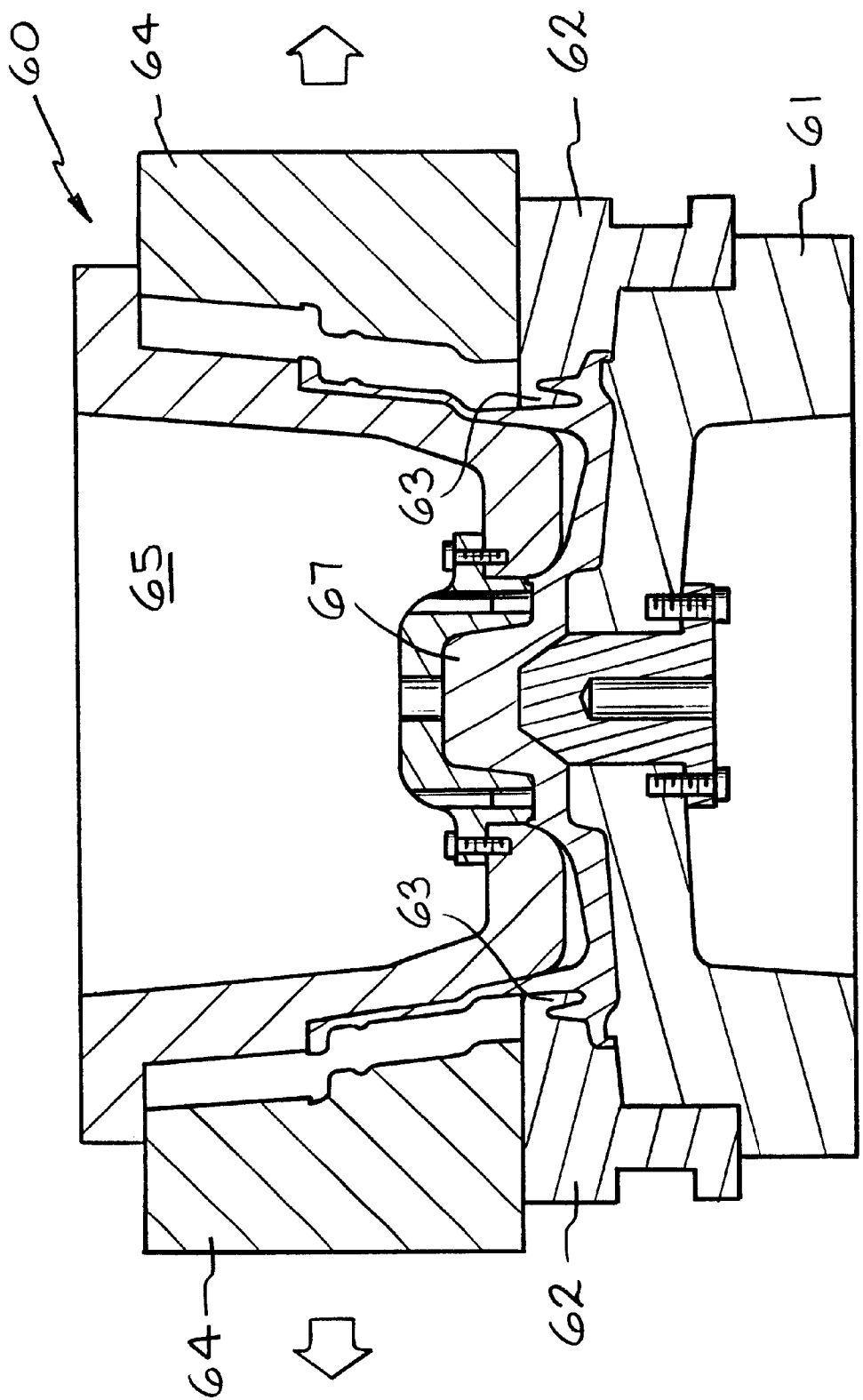
FIG. 6 is a sectional view of the wheel mold shown in FIG. 5 and is illustrative of an alternate embodiment of the process for casting the wheel shown in FIG. 1.
Figure 6B:
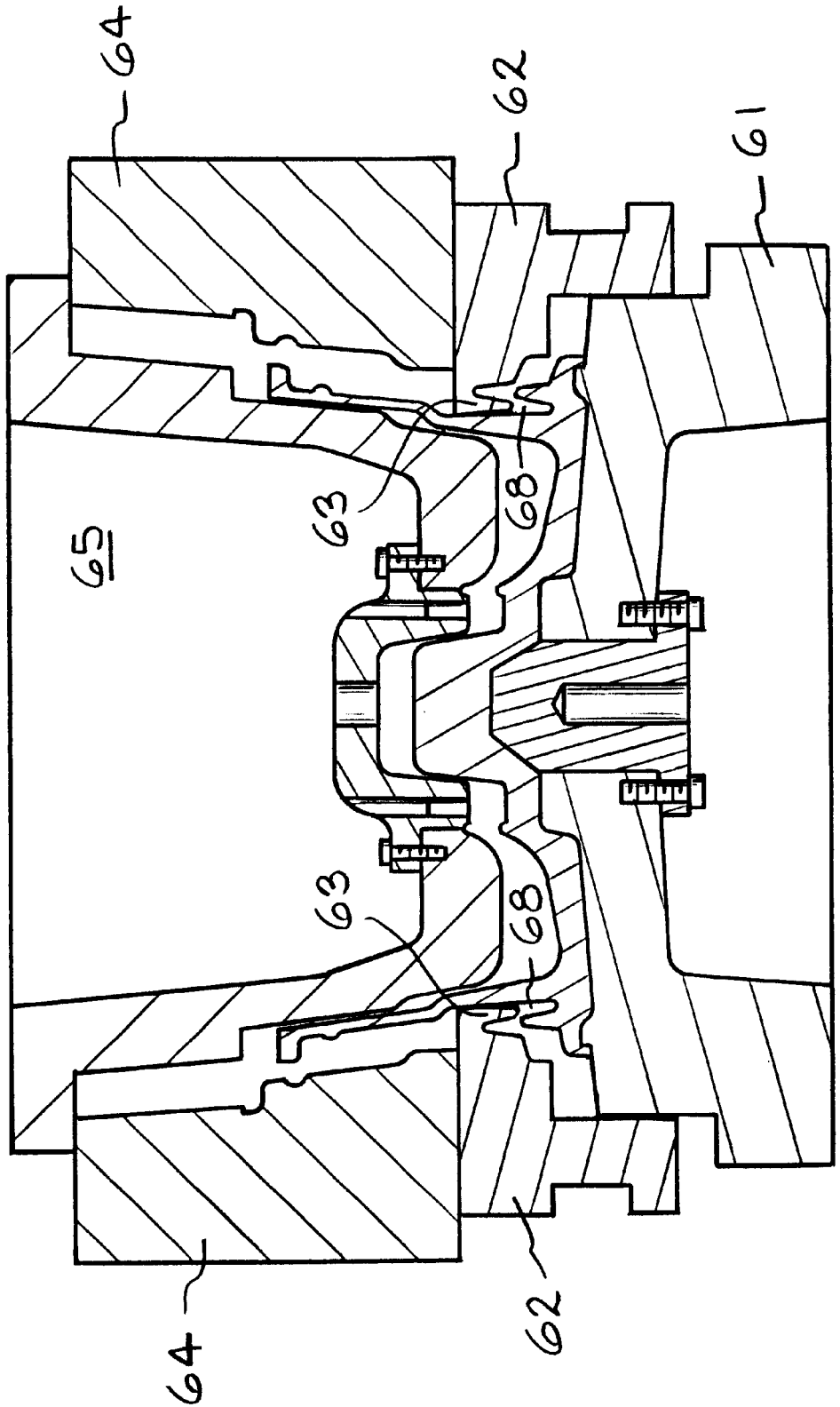
Figure 7A:
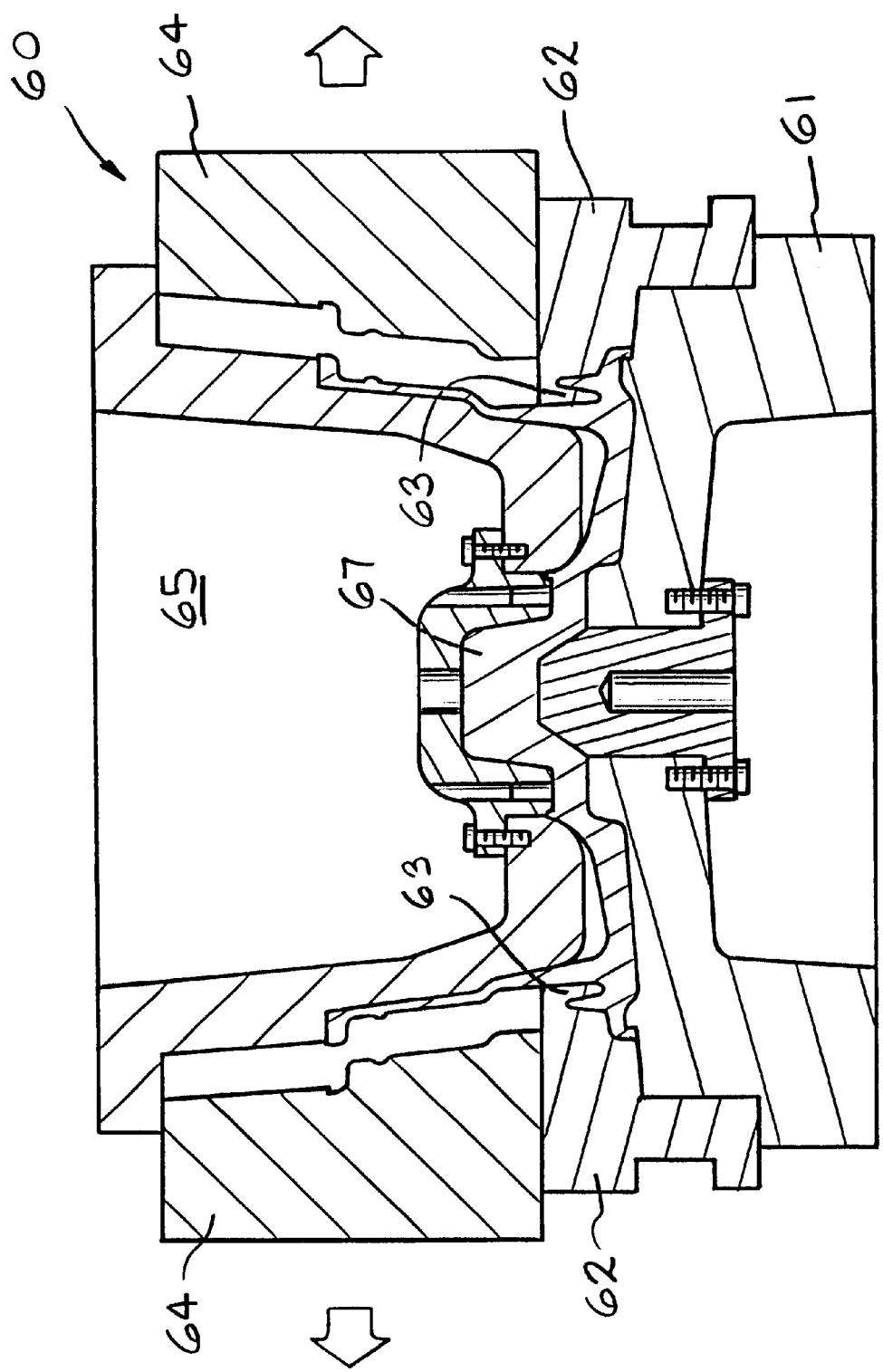
FIG. 7 is a sectional view of the wheel mold shown in FIG. 5 and is illustrative of another embodiment of the process for casting the wheel shown in FIG. 1.
Figure 7B:
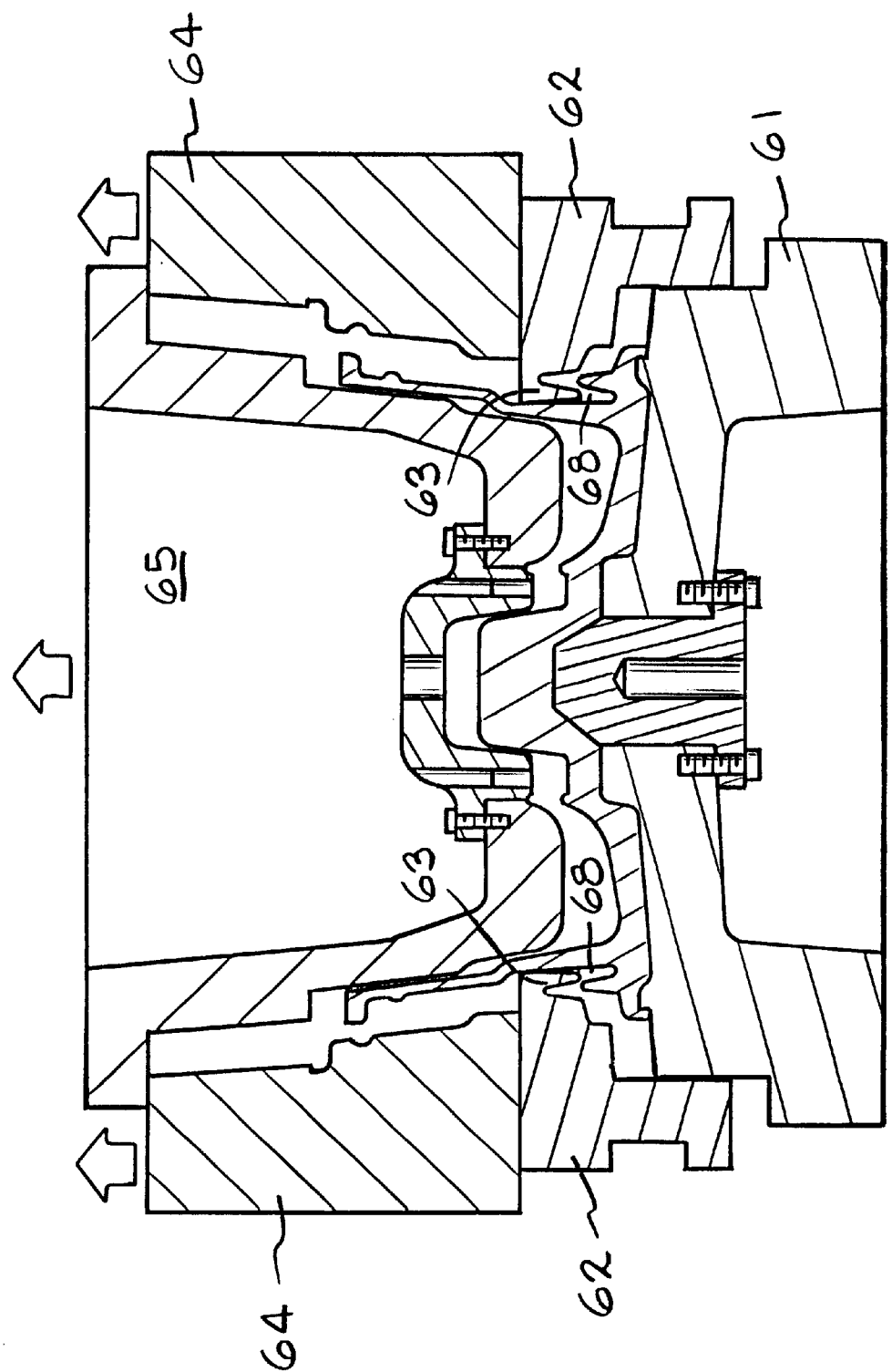
Figure 7C:
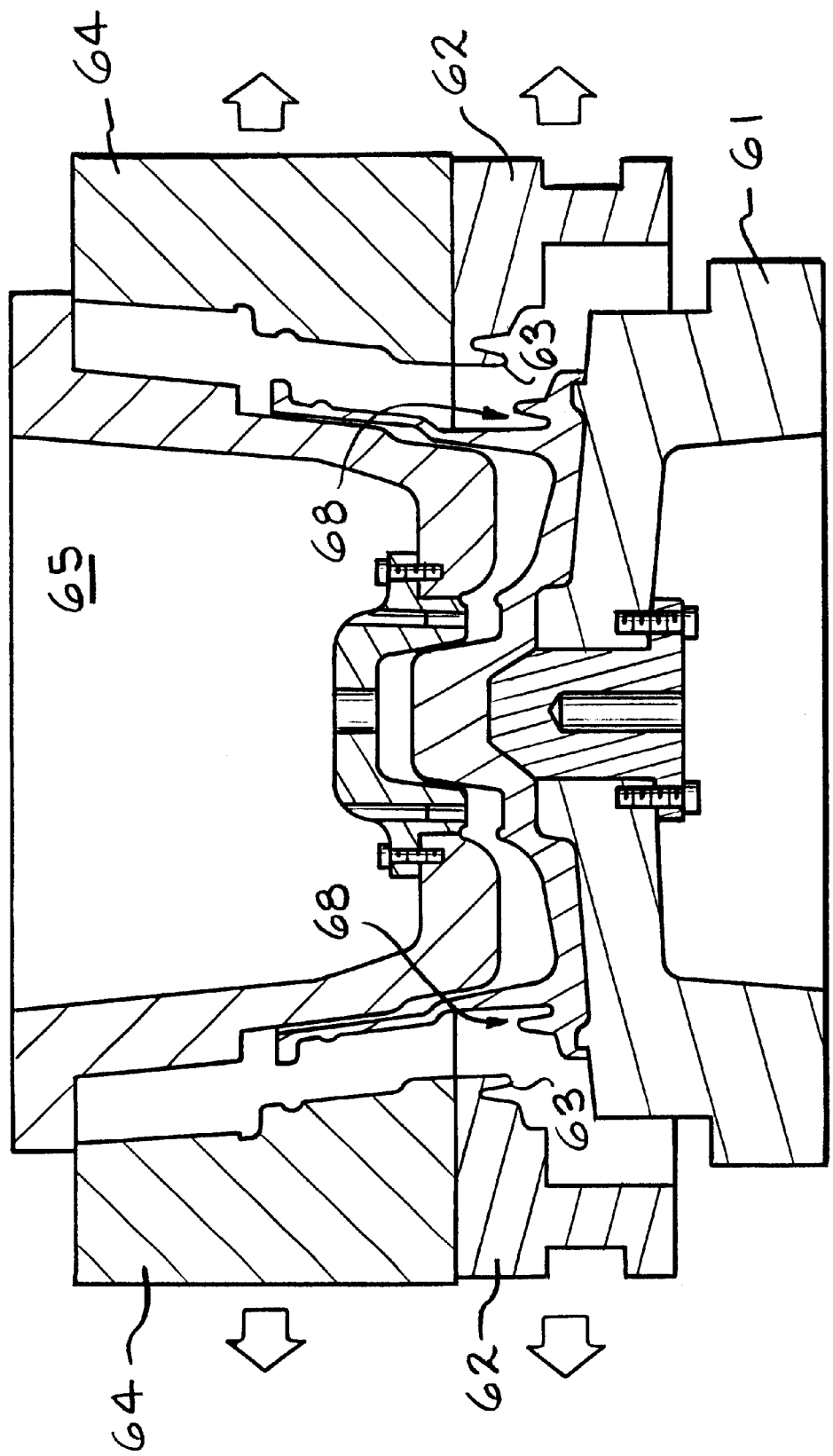
Figure 7D:
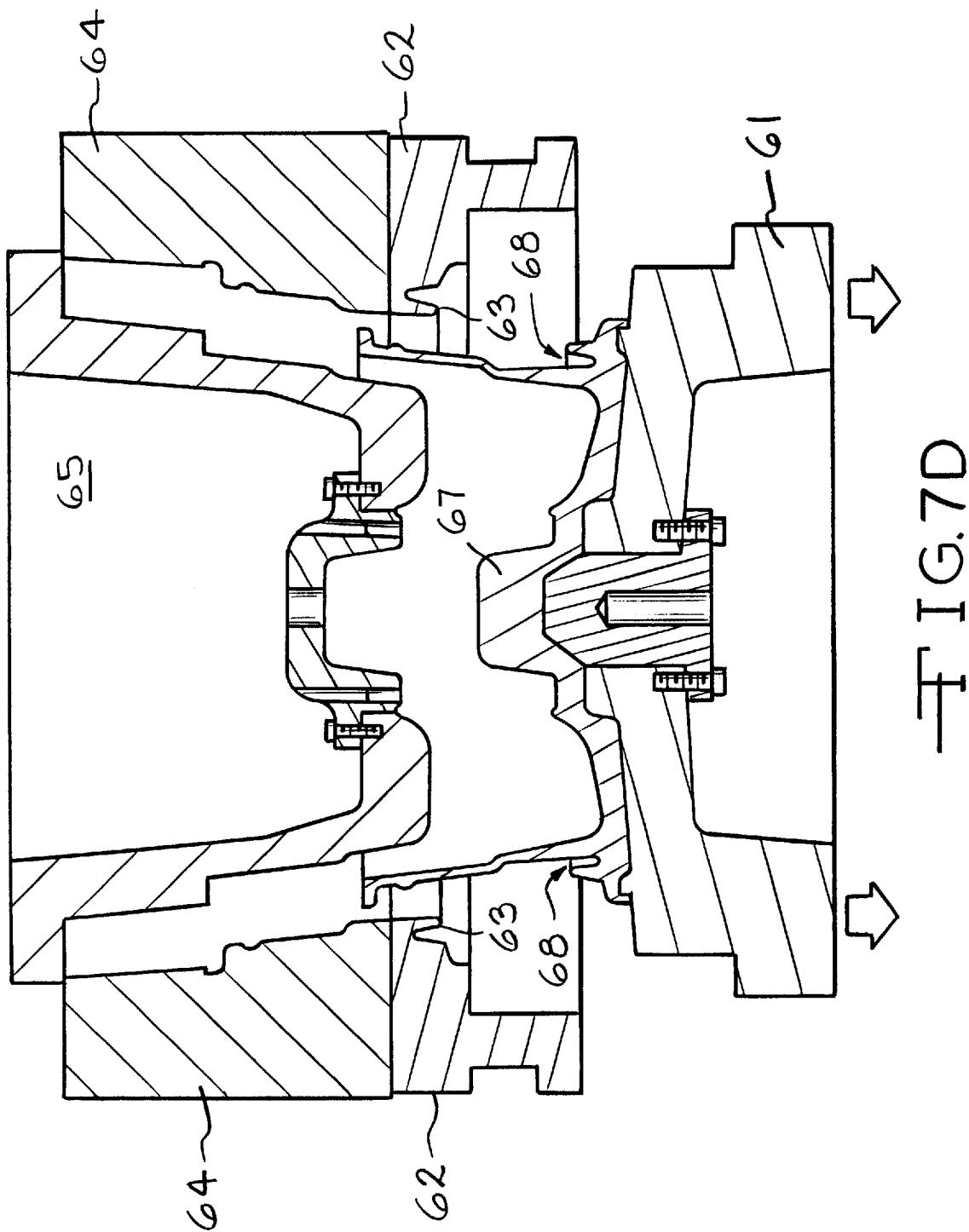

An alternate embodiment of the operation of the mold 60 is illustrated in FIG. 6. In the alternate embodiment, the base member 61 can be moved vertically in an upward or downward direction by a conventional mechanism (not shown). As shown in FIG. 6A, after the wheel casting 67 has solidified, the upper side members 64 are again retracted in a horizontal direction. The upper side members 64 are moved sufficiently to clear the inboard end of the wheel casting 67. Then, as shown in FIG. 6B, the base 61 is moved vertically downward, while the side members 64 and 62 and top core 65 remain stationary. The wheel casting 67 either drops or is moved downward with the base 61, which moves the sidewall portion of the casting 67 away from the lower side member 62 and causes the lightener recess core 63 to be withdrawn from the lightener recess 68.

The base member 61 is lowered sufficiently for the lightener recess core 63 to clear the sidewall portion of the wheel casting 67. Then both the upper and lower side members 64 and 62 are retracted horizontally while the top core 65 is raised vertically to allow removal of the wheel casting 67 from the mold 60 in a similar manner to the movement shown in fig. SD.

Another alternate embodiment of the operation of the mold 60 is illustrated in FIG. 7. As described above for FIG. 6, the base member 61 can be moved vertically in an upward or downward direction by a conventional mechanism (not shown). Similar to the operation shown in FIG. 6A, the upper side members 64 are retracted horizontally sufficiently to clear the inboard end of the wheel casting 67, as is shown in FIG. 7A. In FIG. 7B, the upper core 65 and the upper and lower side members 64 and 62 are simultaneously raised in a vertical direction to extract the lightener pocket core 63 from the casting lightener pocket 68. Alternately, the top core 65 is raised while the side members 64 and 62 remain stationary. Once movement of the top core 65 is completed, the upper and lower side members 64 and 62 are raised. The upper and lower side members 64 and 62 are then retracted horizontally, as shown in FIG. 7C, until the side members 64 and 62 are clear of the inboard end of the wheel casting 67. Finally, as shown in FIG. 7D, the base 61 is moved in a downward vertical direction to extract the wheel casting 67 from the mold 60.

Figure 8A:
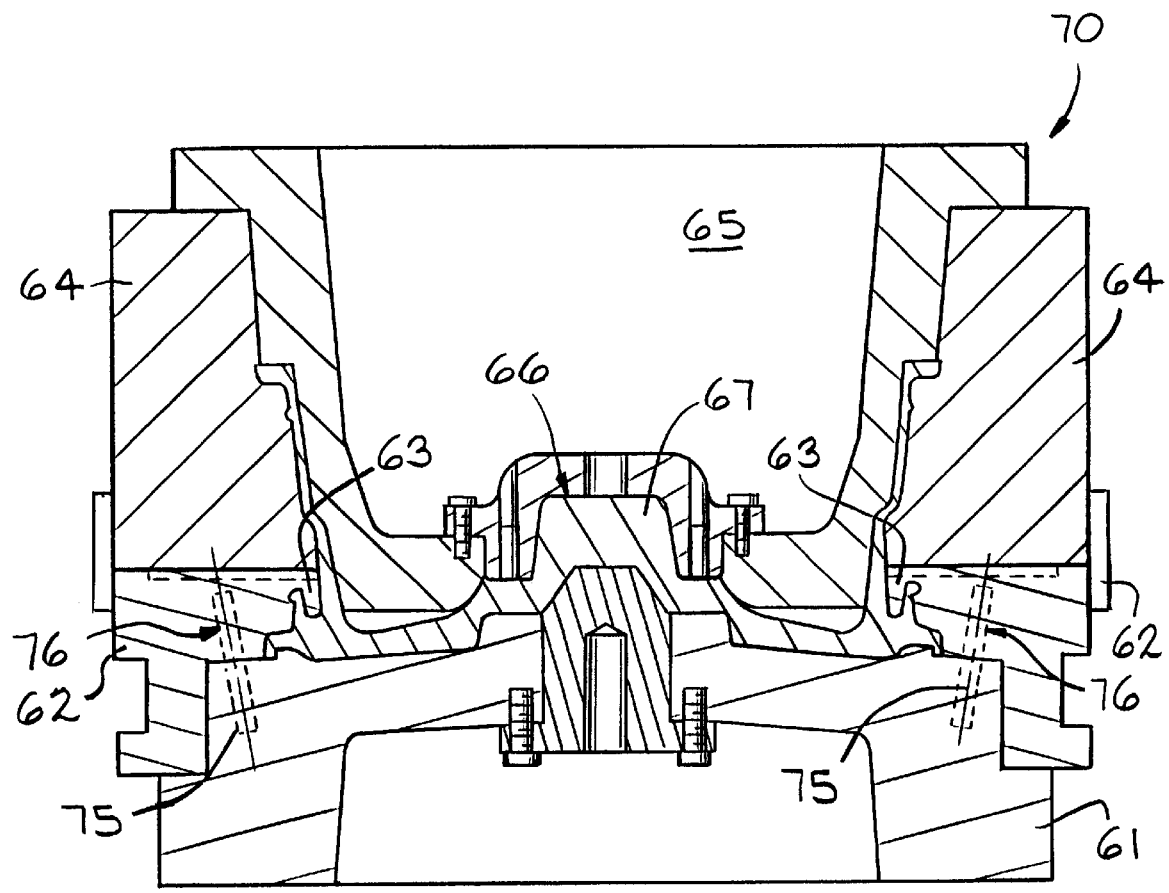
FIG. 8 is a sectional view of an alternate embodiment of the wheel mold shown in FIG. 5 and is illustrative of a process for casting the wheel shown in FIG. 1.

An alternate embodiment of the wheel mold described above is shown at 70 in FIG. 8A. Components of the mold 70 which are similar to components shown in FIG. 5 are identified by the same numerical designators. A plurality of guide pins 75, shown in phantom in FIG. 8A, extend from the base 61 into associated bores 76 formed in the lower side members 62. In the preferred embodiment, the guide pins 75 extend in a generally axial direction and form an angle with the mold axis. Additionally, a conventional mechanism (not shown) is included to both retract and extend the side members 62 and 64 in a horizontal direction and also raise and lower the side members 62 and 64 in a vertical direction.

Figure 8B:
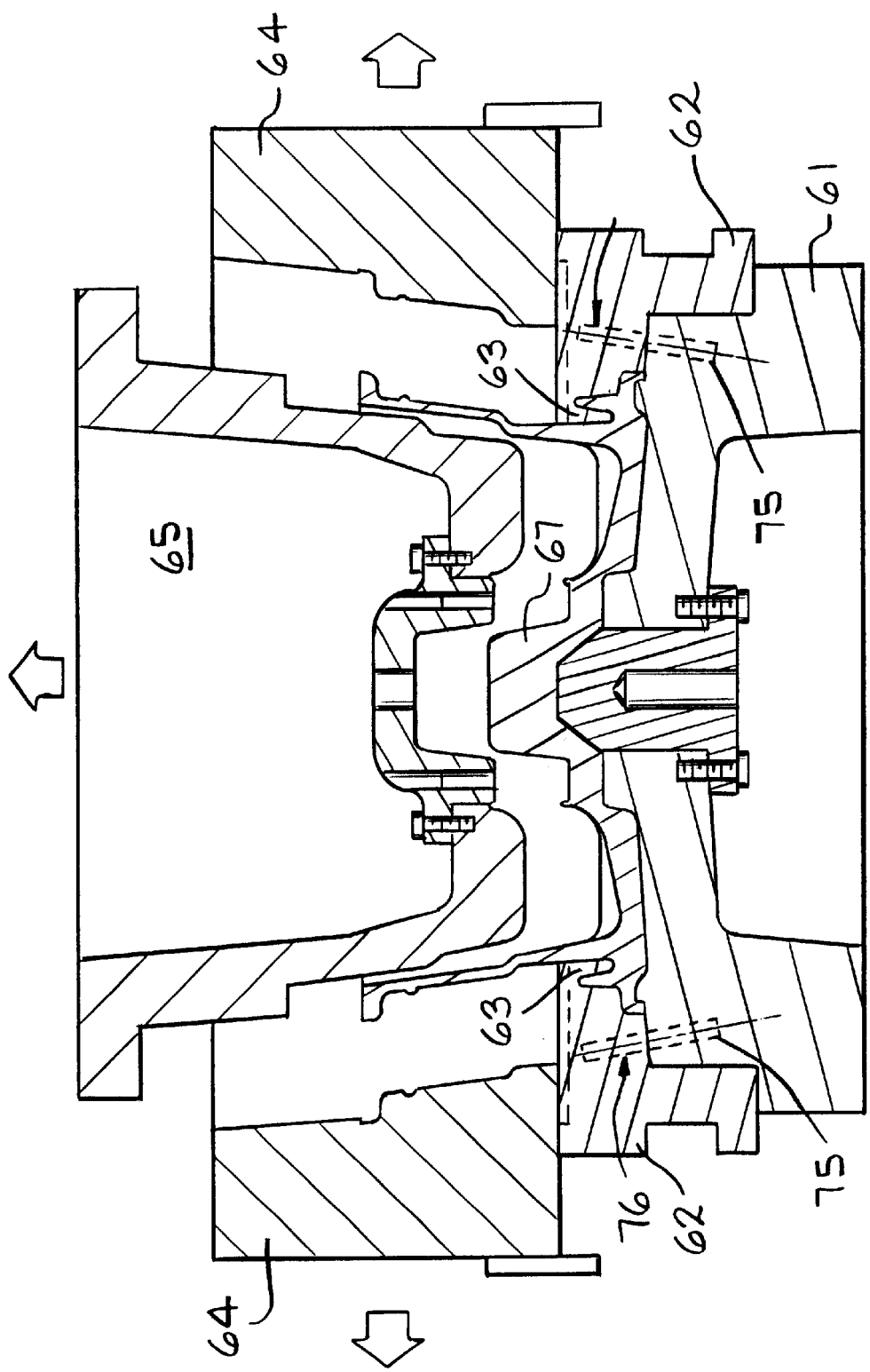
Figure 8C:
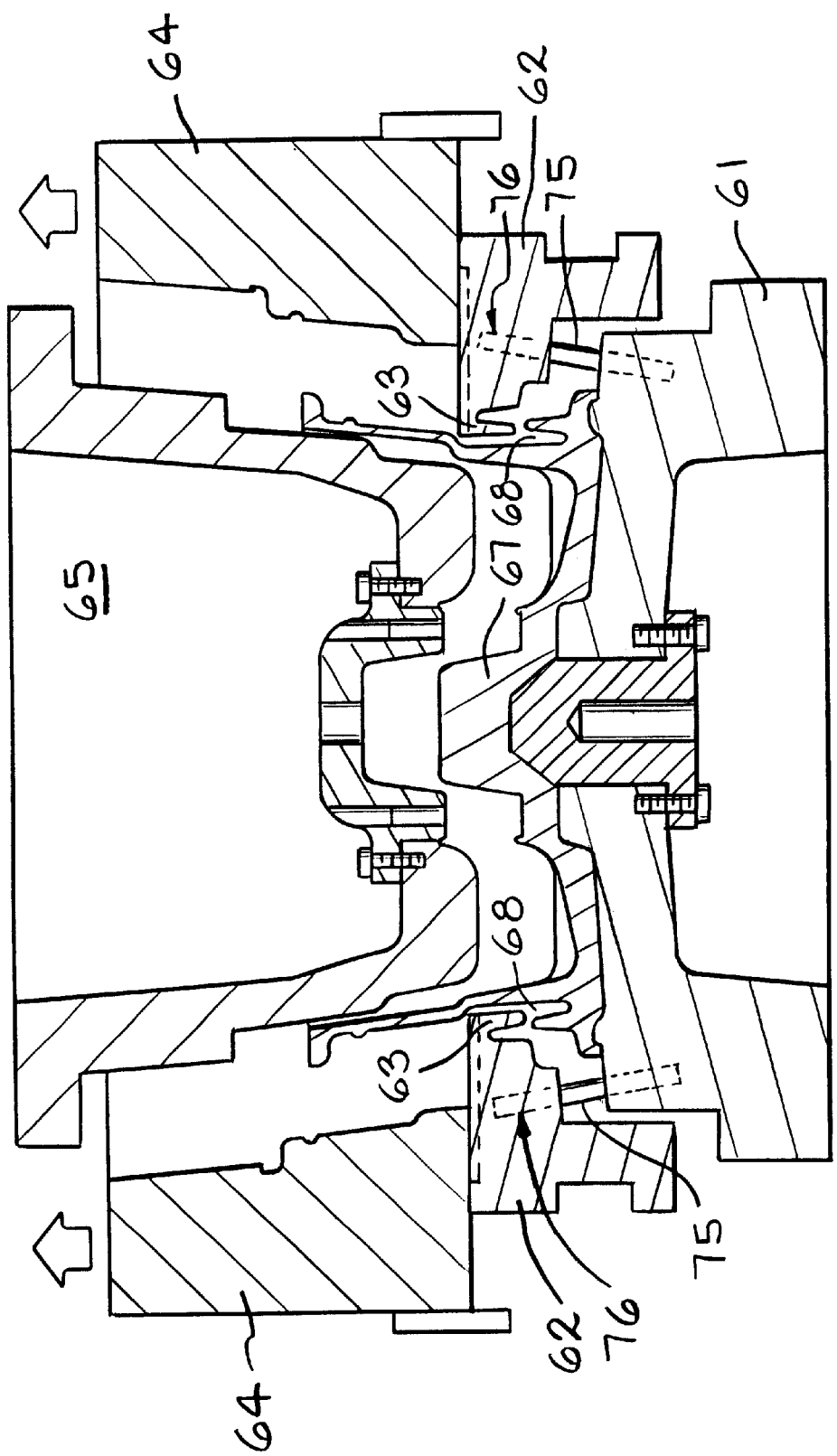
Figure 8D:
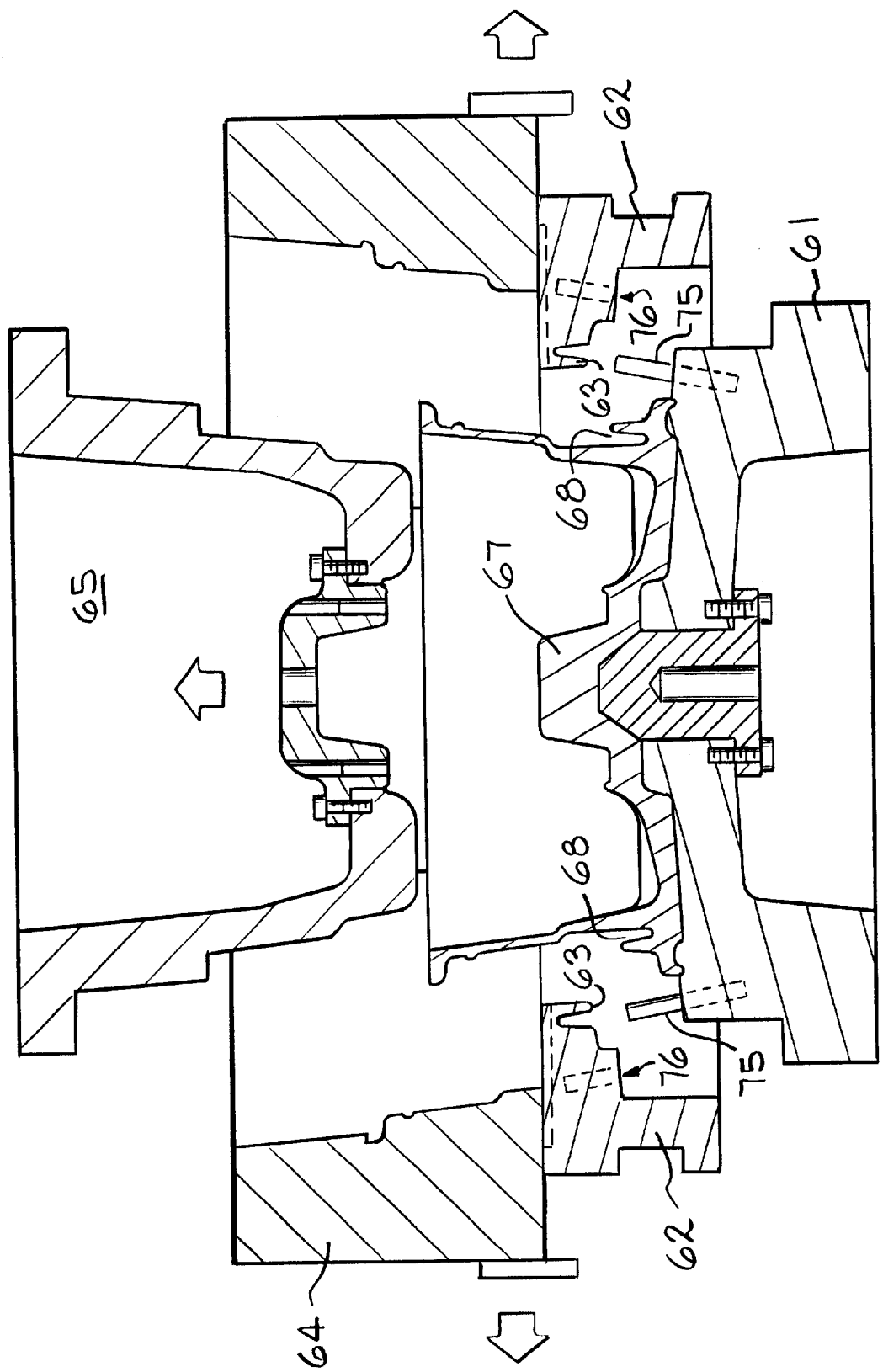

The operation of the wheel mold 70 will now be described. After the wheel casting 67 has cooled sufficiently, the top core 65 is raised and the upper side members 64 are retracted in a horizontal direction, as shown by the arrows in FIG. 8B. The top core 65 is raised sufficiently to allow vertical movement of the side members 62 and 64. As shown by the arrows in FIG. 8C., the upper and lower side members 64 and 62 are moved in an upward vertical direction. As the lower side members 62 are raised, the guide pins 75 cooperate with the bores 76 in the lower side members 62 to guide the withdrawal of the segments of the lightener recess core 63 from of the lightener recess 68 formed in the wheel casting 67. The guide pins 75 also urge the upper and lower side members 64 and 62 in an outward horizontal direction as the side members 64 and 62 are raised. The side members 64 and 62 are raised sufficiently for the lightener recess core 63 to completely clear the lightener recess 68. The side members 64 and 62 are then fully retracted in a horizontal direction and the top core 65 fully raised, as shown in FIG. 8D to allow removal of the wheel casting 67 from the mold 70. The mold 70 members are then closed for casting another wheel.

Another alternate embodiment of the wheel mold is shown generally at 80 in FIG. 9. As above, components which are similar to components shown in FIGS. 5 through 8 have the same numerical designators. The mold 80 includes a separate segmented lightener recess core 81 which is disposed in an annular recess 82 formed in the bottom portion of the upper side members 64 adjacent to the mold cavity 66. Releasable connectors (not shown) are mounted in the ends of the segments of the recess core 81 to form a complete annular core 81. The mold 80 further includes a plurality of L-shaped release levers 83, one of which correspond each of the individual segments of the lightener recess core 81. Each release lever 83 is mounted within a first radial slot 84 formed in the lower side member 62. The release levers 83 include a first long arm 85 which is connected to an associated segment of the recess core 81. A second short arm 86 of each of the release levers 83 extends into a second radial slot 87 formed in the bottom of the upper side member 64. Each of the release levers 83 is mounted upon a pivot pin 88 which extends transversely across the first slot 84. The release levers 83 are free to pivot about the pivot pins 88.

Figure 9A:
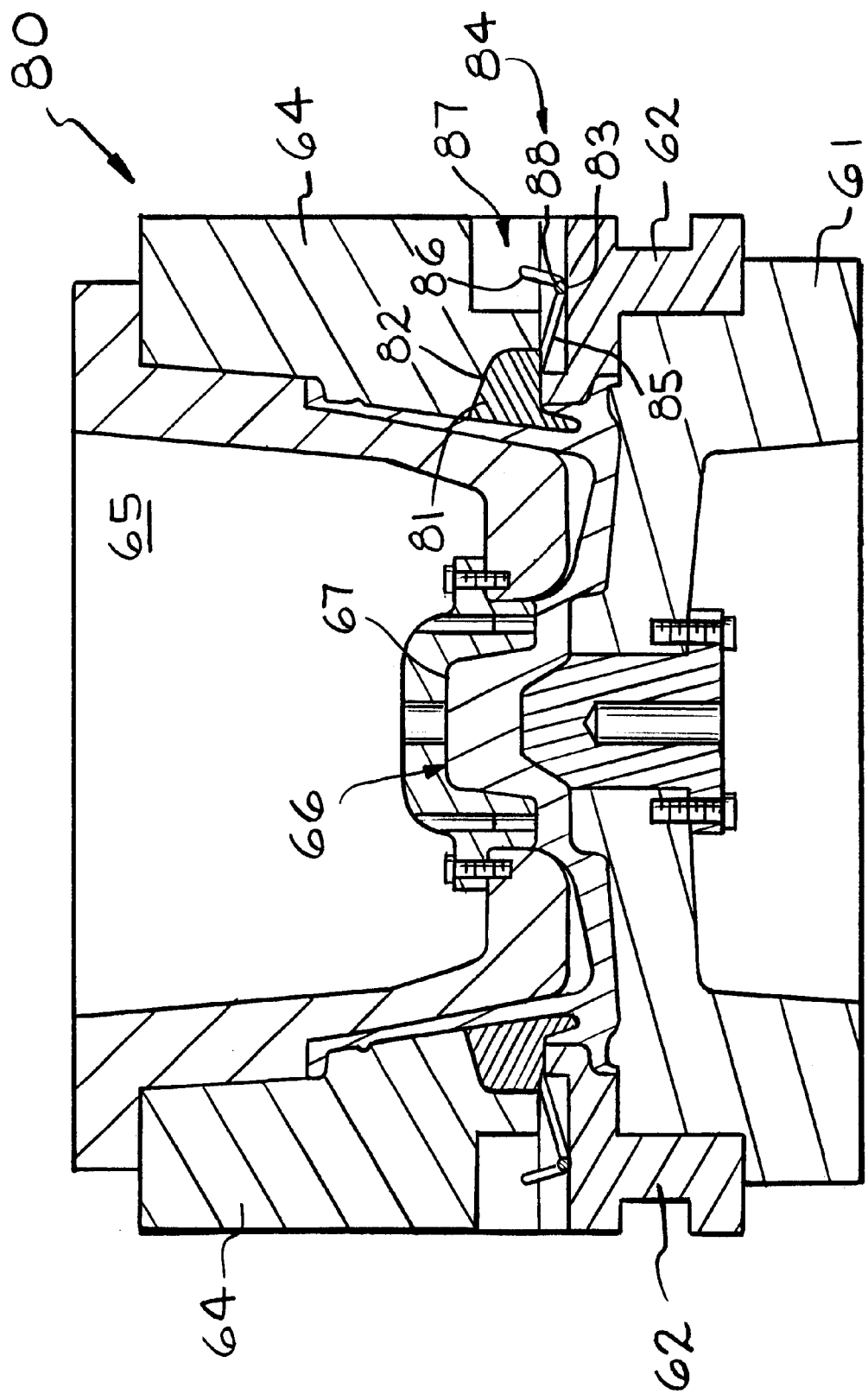
FIG. 9 is a sectional view of another alternate embodiment of the wheel mold shown in FIG. 5 and is illustrative of a process for casting the wheel shown in FIG. 1.
Figure 9B:
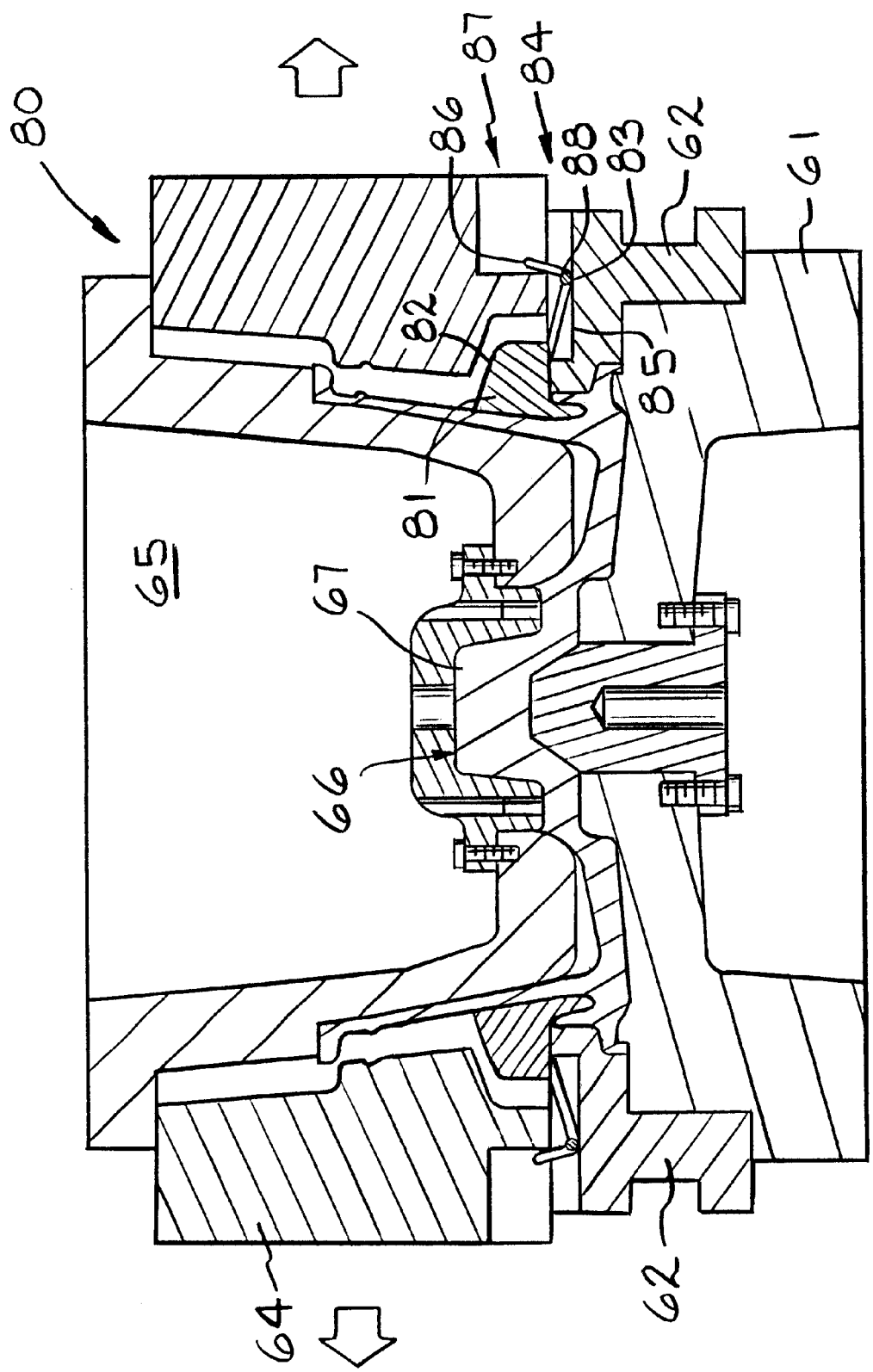
Figure 9C:
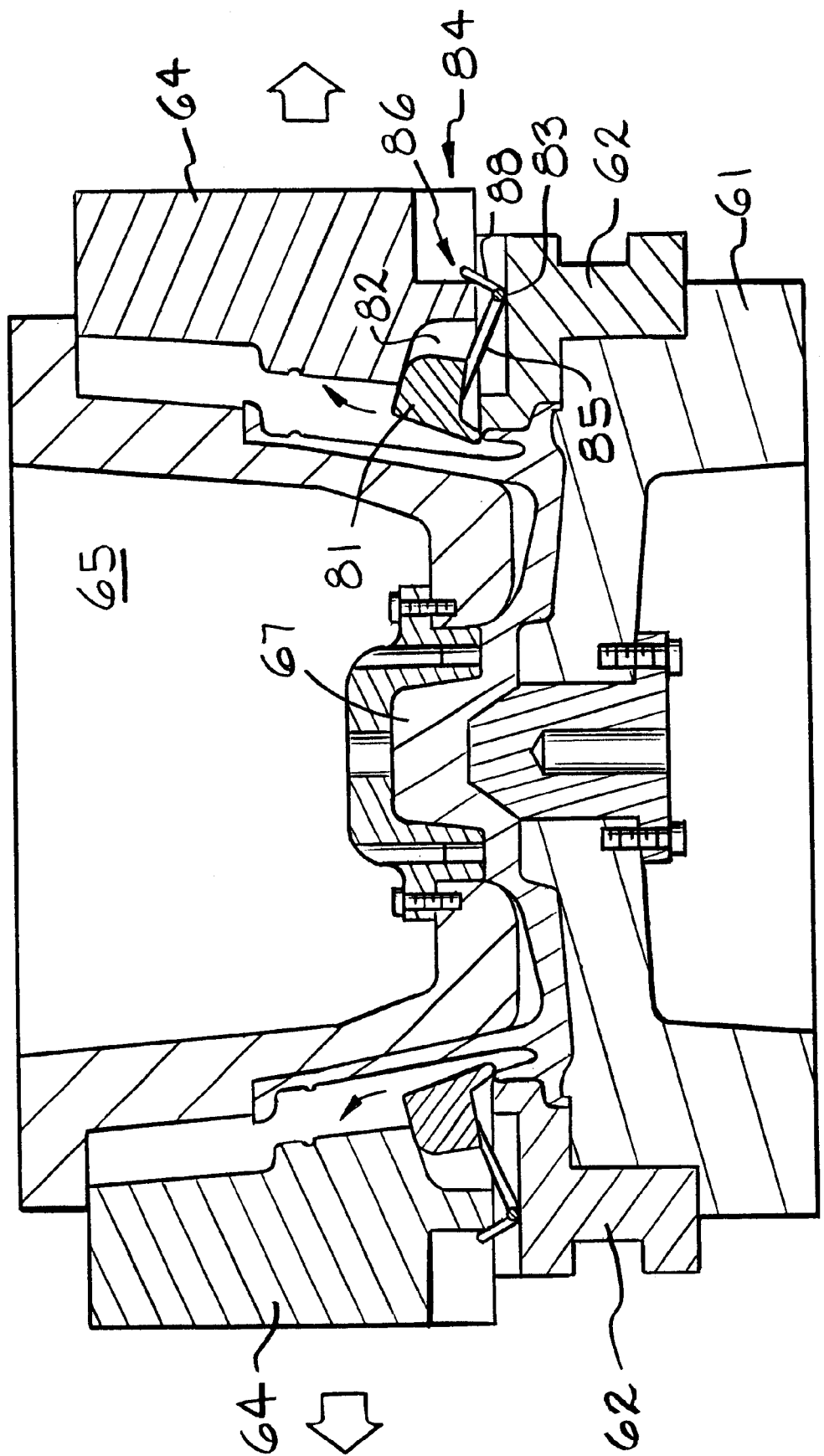
Figure 9D:
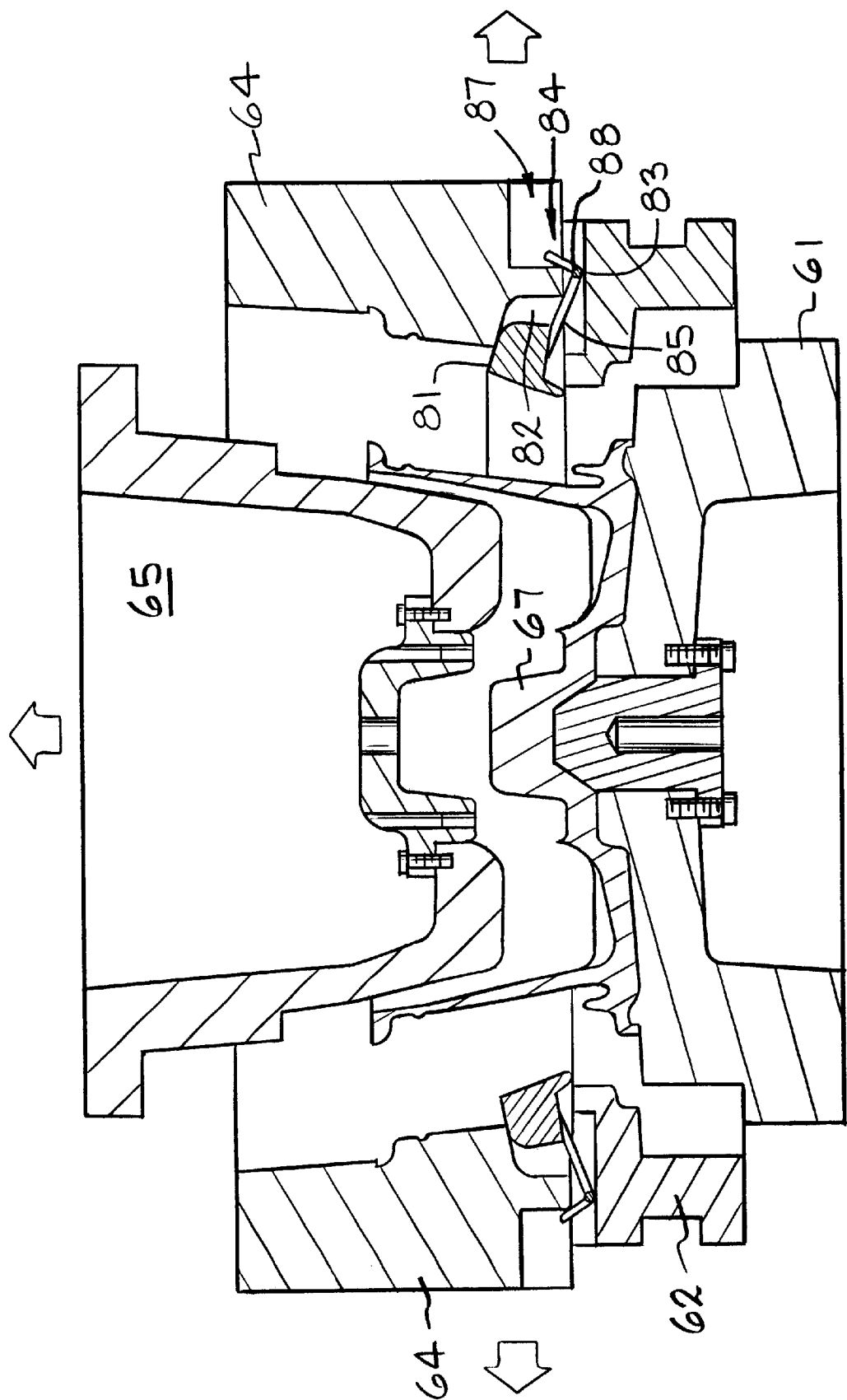

The operation of the wheel mold 80 will now be described. After the wheel casting 67 has cooled sufficiently, the upper side members 64 are retracted in a horizontal direction, as shown by the arrows in FIG. 9B. As the upper side members 64 are retracted, the annular recess 82 is moved clear of the segments of the lightener recess core 81. Additionally, the end portions of the second slots 87 contact the short arms 86 of the release levers 83. As the upper side members 64 continue to retract, the release lever short arms 86 are pivoted in downward direction. As the short arms 86 pivot downward, the release lever long arms 85 are pivoted in an upward direction. The movement of the long arms 85 extract the associated segments of the lightener recess core 81 from of the lightener recess 68 in the wheel casting 67, as illustrated in FIG. 9C. Once the core segments are clear of the lightener recess 68, both the upper and lower side segments 64 and 62 are fully retracted in a horizontal direction while the top core 65 is raised, as shown in FIG. 9D, to allow removal of the wheel casting 67 from the mold 80.

Figure 10A:
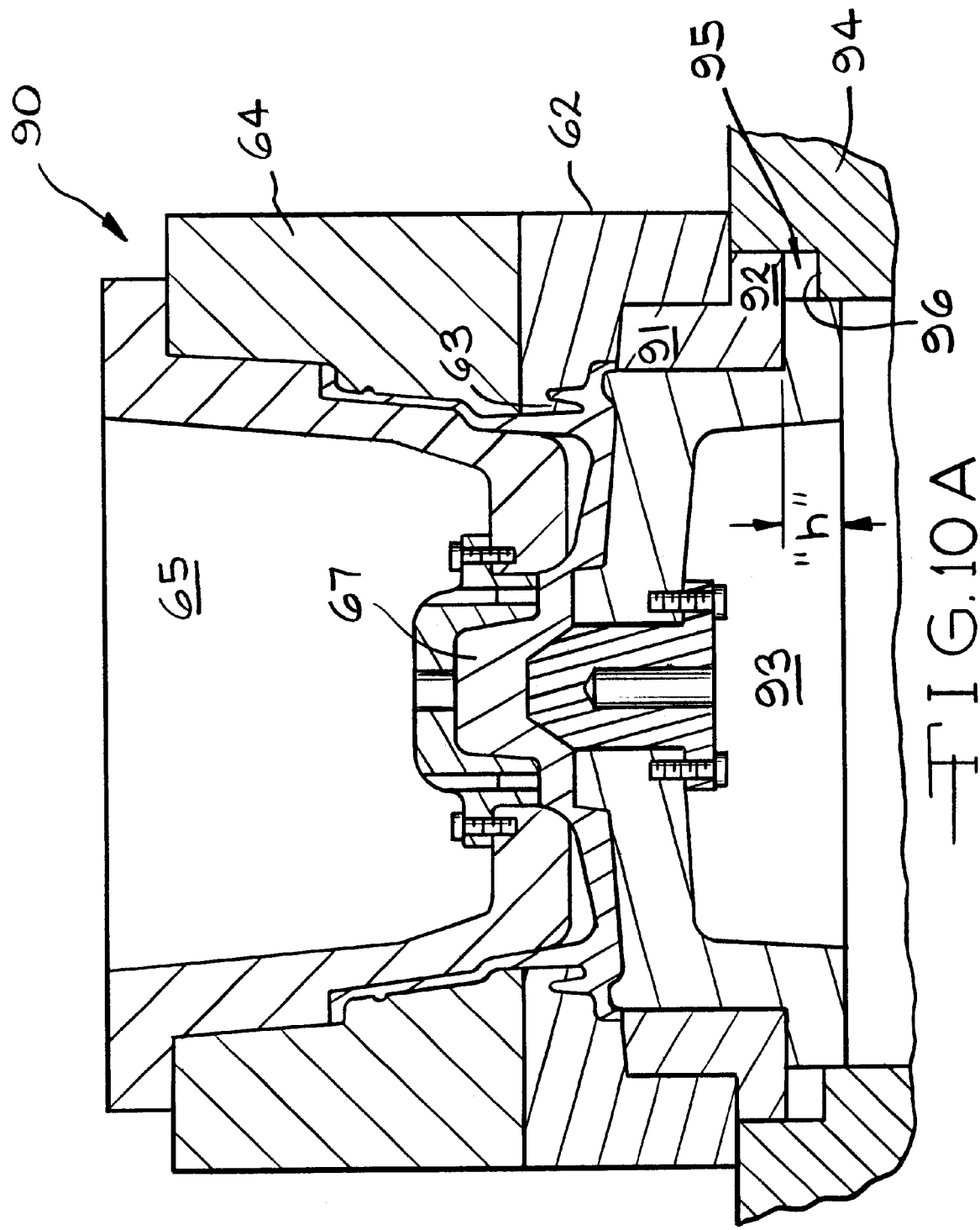
FIG. 10 is a sectional view of another alternate embodiment of the wheel mold shown in FIG. 5 and is illustrative of a process for casting the wheel shown in FIG. 1.

Another alternate embodiment of the wheel mold is shown generally at 90 in FIG. 10. As above, components which are similar to components shown in FIGS. 5 through 9 have the same numerical designators. The mold 90 includes a pilot ring 91 having a radially extending flange 92. The pilot ring 91 is disposed between a base member 93 and the lower side members 62 of the mold 90. The mold 90 is supported by a conventional casting machine base 94. An annular recess 95 formed in the machine base 94 receives the pilot ring flange 92. The recess 95 includes a bottom surface which, as will be described below, forms a stop 96 for the pilot ring flange 92. As shown in FIG. 10A, the pilot ring flange 92 is spaced from the stop 96 by a height "h". For reasons given below, the height, h, is greater than the greatest depth of the lightener recess 68 formed in the wheel casting 67. As with the molds described above, conventional mechanisms are provided to move the mold components.

Figure 10B:
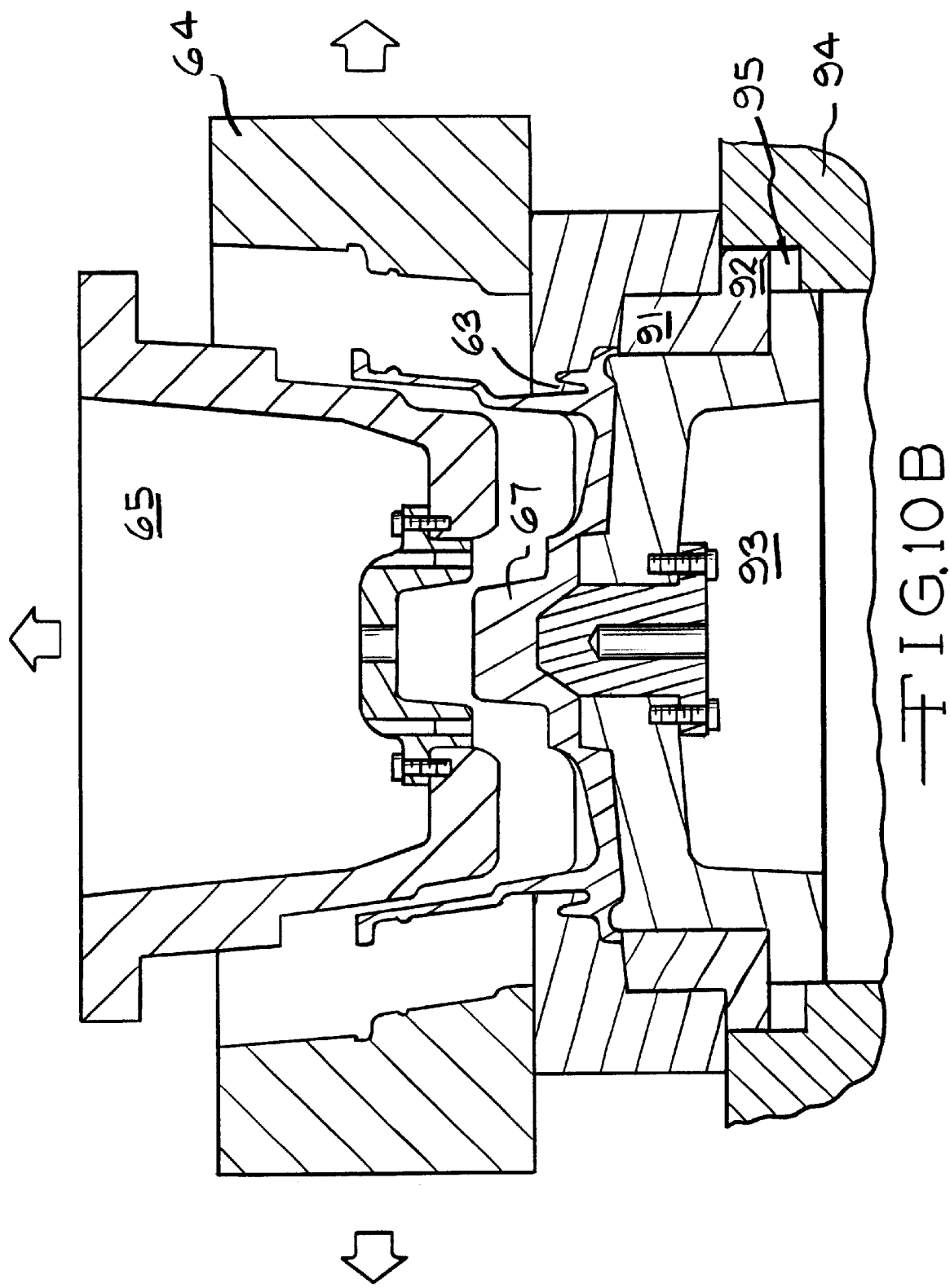

The operation of the mold 90 will now be described. As shown in FIG. 10B after the wheel casting 67 has solidified, the top core 65 is retracted in an upward vertical direction while the upper side members 64 are retracted in a horizontal direction. The upper side members 64 are moved sufficiently to clear the inboard end of the wheel casting 67. Then, as shown in FIG. 10C, the base member 93 and pilot ring 91 are moved vertically downward, while the lower side members 64 remain stationary. The wheel casting 67 will typically adhere to the base member 93 and pilot ring 91 and move downward therewith, separating and withdrawing the lightener recess 68 from the lightener recess core 63. The base member 93 and pilot ring 91 continue to move downward together until the pilot ring flange 92 contacts the stop 96. The stop 96 cooperates with the pilot ring flange 92 to stop the downward movement of the pilot ring 91 after the wheel casting 67 has been moved downward by the height h. Because the distance traveled by the wheel casting has exceeded the depth of the lightener recess 68, the recess core 63 is clear of the lightener recess 68. As shown in FIG. 10D, the downward movement of the base member 93 continues, separating the face of the wheel casting 67 from the base member 93. Additionally, the lower side members 62 are retracted in a horizontal direction. The movable mold members are completely withdrawn to allow access to the wheel 67 which is now supported only by the pilot ring 91 and can be removed from the casting machine. After the casting 67 is removed, the mold 90 is closed in preparation for casting another wheel.

Figure 11:
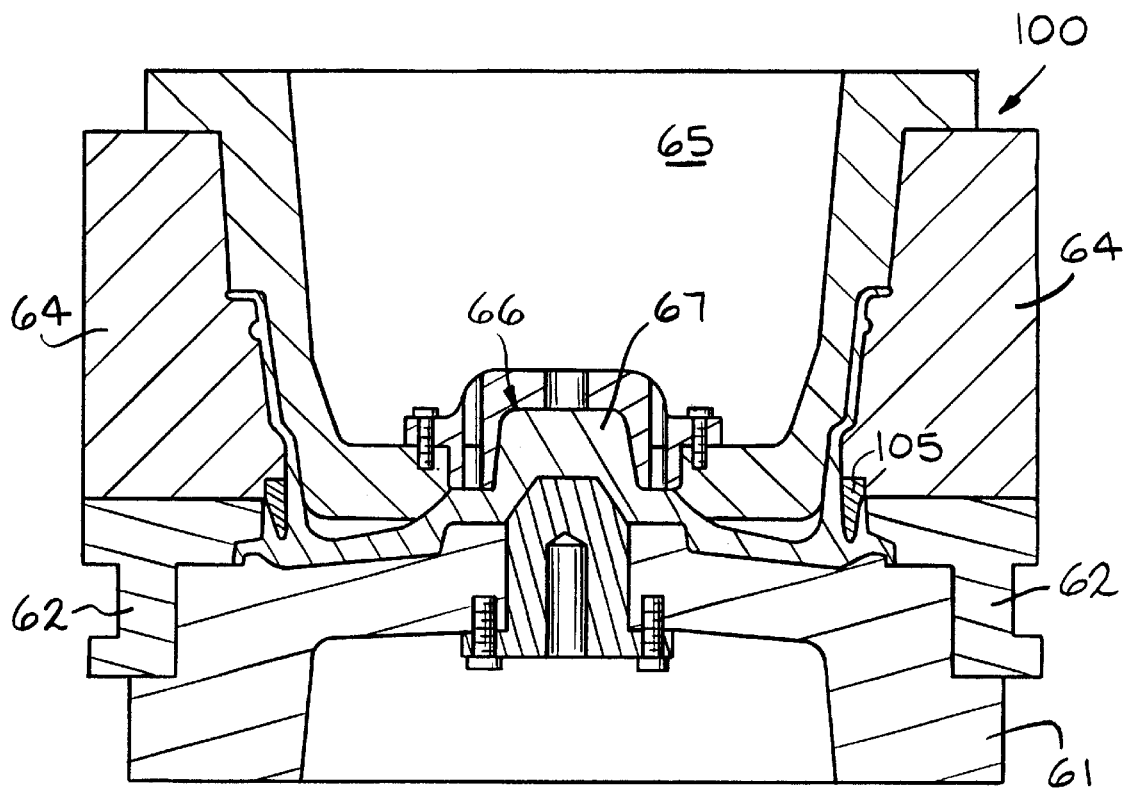
FIG. 11 is a sectional view of another wheel mold used to cast the wheel shown in FIG. 1.
Figure 12:
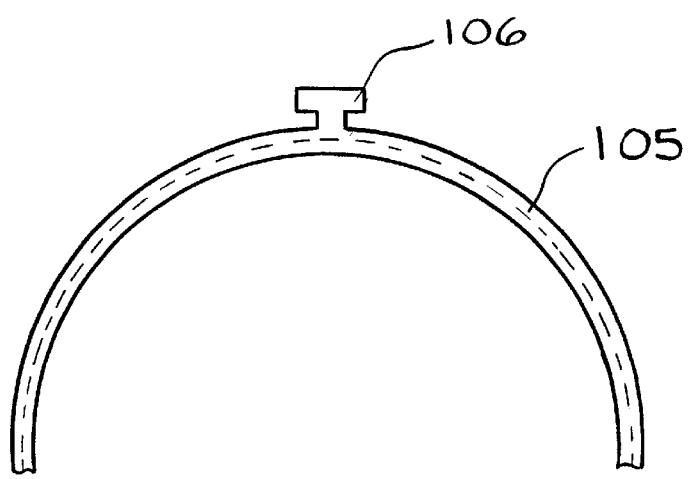
FIG. 12 is a plan view of a core which is included in the mold shown in FIG. 11.

While the embodiments described above all include a reusable core which is formed integrally as a portion of one of the mold members for forming the lightener recess, the invention also contemplates forming the lightener recess 68 with a separate recess core. A mold 100 utilizing a separate core 105 is shown in FIG. 11, where components which are similar to components shown in FIGS. 5 through 10 have the same numerical designators. A plan view of the core 105 is shown in FIG. 12. In the preferred embodiment, the core 105 is formed as one piece from a ceramic material; however, other materials can be used. For example, the core 105 also can be formed with a plurality of steel segments which are joined by quick disconnect connectors (not shown). A plurality of core support members 106 (one shown) extend radially from the core 105. The core support members 106 are received by corresponding recesses (not shown) formed in the mold base 61. The core support members 106 position the core 105 within the mold cavity 66. Additionally, a radial notch (not shown) can be formed transversely across the core 105. The notch would form the small bridge for the tire valve aperture as described above.

The operation of the wheel mold 100 will now be described. Before charging the mold 100 with molten metal, the lower side members 62 are closed to provide a nest for the core 105. The core 105, which can be sprayed with a commercial release agent, such as, for example, talc or graphite, is placed into the nest and the upper side members 64 are closed to lock the core 105 in position. The invention also contemplates that the core 105 can be preheated before being inserted into the mold 100. The top core 65 is extended downward into the mold 100 to form the mold cavity 66. The mold 100 is then charged with molten metal to form a wheel casting. After the wheel casting has cooled sufficiently, the mold is opened and the wheel casting and core 105 removed. It is contemplated that a ceramic core would be broken and discarded while a steel core would be removed from the wheel casting and reused.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope. It will be appreciated that a specific feature described for one embodiment can be utilized in the other embodiments. For example, similar to the separate lightener recess cores, the recess cores which are formed integrally with the mold members also can be sprayed with a release agent and preheated before a wheel is cast.

What is claimed is:

1. A method for forming a one piece vehicle wheel comprising the steps of:

(a) providing a multi-piece mold for a one piece wheel, the mold including a base member which supports a plurality of upper side members and a plurality of lower side members and a top core, the members and top core defining a wheel cavity having a rim cavity joining a disc to define a sidewall cavity, the mold having an axis and further including an annular lightener recess core which extends axially into the sidewall cavity, the lightener recess core including a plurality of segments integrally formed as a portion of the lower side members;

(b) charging the mold cavity with molten metal to form a one piece wheel;

(c) cooling the mold to solidify the molten metal into a one piece wheel casting, the annular core forming a lightener recess in the sidewall of the wheel casting; and (d) sequentially withdrawing the upper and lower side members to extract the lightener core segments from the wheel casting while opening the mold to release a wheel casting having an annular lightener recess formed in the sidewall.

2. The method according to claim 1 wherein step (d) includes:

(d1) moving the upper side members in a direction perpendicular to the mold axis a sufficient distance to clear the upper edge of the top core;

(d2) moving the upper and lower side members in a direction parallel to the mold axis a sufficient distance to withdraw the lightener recess core from the lightener recess formed in the wheel casting; and (d3) moving the top core in a direction parallel to the mold axis and the upper and lower side members in a direction perpendicular to the mold axis sufficiently to allow removal of the wheel casting from the mold.

3. The method according to claim 2 wherein the recess core includes at least one portion which extends in an outward radial direction, the outwardly extending portion being operative in step (b) to form a pocket in the recess.

4. The method according to claim 1 wherein step (d) includes:

(d1) moving the upper side members in a direction perpendicular to the mold axis a sufficient distance to clear the inboard end of the wheel casting;

(d2) moving the base member in a direction parallel to the mold axis a sufficient distance to withdraw the lightener recess core from the lightener recess formed in the wheel casting; and (d3) moving the top core in a direction parallel to the mold axis and the upper and lower side members in a direction perpendicular to the mold axis sufficiently to allow removal of the wheel casting from the mold.

5. The method according to claim 1 wherein step (d) includes:

(d1) moving the upper side members in a direction perpendicular to the mold axis a sufficient distance to clear the inboard end of the wheel casting;

(d2) moving the upper and lower side members and the top core in a direction parallel to the mold axis a sufficient distance to withdraw the lightener recess core from the lightener recess formed in the wheel casting; and (d3) moving the upper and lower side members in a direction perpendicular to the mold axis sufficiently to clear the wheel casting; and (d4) moving the base member in a direction parallel to the mold axis to withdraw the wheel casting from the mold.

6. The method according to claim 1 wherein the mold provided in step (a) includes at least one alignment pin mounted in a bore formed in the base member, the alignment pin being slidingly received by a corresponding bore formed a lower side member; and further wherein step (d) includes:

(d1) moving the top core in a direction parallel to the mold axis and the upper side members in a direction perpendicular to the mold axis a sufficient distance to clear the inboard end of the wheel casting;

(d2) moving the upper and lower side members in a direction parallel to the mold axis while the alignment pin urges the upper and lower side members in a direction perpendicular to the mold axis to withdraw the lightener recess core from the lightener recess formed in the wheel casting; and (d3) opening the mold sufficiently to remove the wheel casting therefrom.

7. The method according to claim 1 wherein the lightener recess core is segmented and the mold includes a plurality of side members which are connected by a pivoting lever mechanism to the recess core segments and further wherein step (d) includes withdrawing the side members to actuate the lever mechanism, the lever mechanism being operative to withdraw the core segments from the lightener cavity formed in the wheel casting.

8. The method according to claim 1 wherein the mold includes an annular pilot ring disposed between the side members and the base member and step (d) includes withdrawing the base member and pilot ring in a direction parallel to the mold axis to draw the casting away from the lightener core.

9. The method according to claim 1 wherein the lightener recess core is a separate ring which is carried by the mold members and step (d) includes opening the mold members to remove the wheel casting and core and subsequently removing the core from the wheel casting.

* * * * *